United States Patent
Cohen et al.

(10) Patent No.: US 8,038,446 B2
(45) Date of Patent: Oct. 18, 2011

(54) HYGIENE TRAINING DEVICE AND METHOD

(75) Inventors: Jason C. Cohen, Appleton, WI (US); Thomas G. Shannon, Neenah, WI (US); Eric D. Johnson, Larsen, WI (US); Andrew P. Bakken, Appleton, WI (US); Corey T. Cunningham, Larsen, WI (US); Steven R. Kehn, Appleton, WI (US); Cynthia Watts Henderson, Neenah, WI (US); Kathryn J. Sirovatka, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1073 days.

(21) Appl. No.: 11/899,934

(22) Filed: Sep. 7, 2007

(65) Prior Publication Data

US 2009/0068633 A1    Mar. 12, 2009

(51) Int. Cl.
*G09B 19/00* (2006.01)
(52) U.S. Cl. ........................ 434/258; 434/247
(58) Field of Classification Search .................. 434/236, 434/238, 247, 257, 258
See application file for complete search history.

(56) References Cited

U.S. PATENT DOCUMENTS

| 4,022,211 A | 5/1977 | Timmons et al. |
| 4,044,405 A * | 8/1977 | Kreiss ........................... 434/247 |
| 4,169,169 A | 9/1979 | Kitabatake |
| 4,171,982 A | 10/1979 | Lin |
| 4,185,413 A | 1/1980 | Goldfarb et al. |
| D254,898 S | 5/1980 | Buerk |
| 4,221,060 A | 9/1980 | Moskowitz et al. |
| 4,749,104 A | 6/1988 | Chao |
| 4,961,717 A | 10/1990 | Hickey |
| 4,982,874 A | 1/1991 | Pringle |
| 5,043,013 A | 8/1991 | Kluger et al. |
| 5,071,387 A | 12/1991 | Pottick |
| 5,117,515 A * | 6/1992 | White et al. ....................... 4/661 |
| 5,172,863 A | 12/1992 | Melone et al. |
| 5,230,648 A | 7/1993 | Kelley et al. |
| 5,586,501 A | 12/1996 | Burguera et al. |
| 5,702,571 A | 12/1997 | Kamps et al. |
| 5,826,515 A | 10/1998 | Frable et al. |
| 5,833,789 A | 11/1998 | Rosendale et al. |
| 5,897,038 A | 4/1999 | Myers |

(Continued)

FOREIGN PATENT DOCUMENTS

JP    2002-034833 A    2/2002

(Continued)

OTHER PUBLICATIONS

George Carlin, Napalm and Silly Putty, p. 128 (2001).*

(Continued)

*Primary Examiner* — Kurt Fernstrom
(74) *Attorney, Agent, or Firm* — John L. Brodersen; Sarah Ann Dressel

(57) ABSTRACT

A training device for nasal hygiene comprises a facial tissue sheet; where the facial tissue sheet has a first side, and where the facial tissue sheet also has a second side having an opposing planar relationship to the first side. A first-side tissue graphic is visible on the first side of the facial tissue sheet. The first-side tissue graphic comprises a permanent graphic and/or an active graphic. In addition, the first-side tissue graphic is a training mark.

24 Claims, 16 Drawing Sheets

U.S. PATENT DOCUMENTS

| | | | |
|---|---|---|---|
| 6,031,461 | A | 2/2000 | Lynn |
| 6,039,213 | A | 3/2000 | Sloan et al. |
| D425,346 | S | 5/2000 | Thompson |
| 6,147,607 | A | 11/2000 | Lynn |
| 6,211,788 | B1 | 4/2001 | Lynn et al. |
| 6,257,410 | B1 | 7/2001 | Ulmann et al. |
| 6,554,679 | B1 | 4/2003 | Shackelford et al. |
| 6,572,301 | B1 | 6/2003 | Robinson |
| 6,635,797 | B2 | 10/2003 | Olson et al. |
| 6,710,221 | B1 | 3/2004 | Pierce et al. |
| 6,811,403 | B1* | 11/2004 | Camarena .................. 434/258 |
| 6,926,532 | B1 | 8/2005 | Brattesani |
| D533,357 | S | 12/2006 | Sarbo et al. |
| 7,175,498 | B2 | 2/2007 | Garpow et al. |
| 7,373,673 | B1* | 5/2008 | Holland ........................ 4/661 |
| 7,540,741 | B2* | 6/2009 | Kemp et al. ................. 434/247 |
| 2003/0124953 | A1 | 7/2003 | Hornsby et al. |
| 2003/0152896 | A1* | 8/2003 | Hudson ....................... 434/258 |
| 2004/0003521 | A1 | 1/2004 | Penn et al. |
| 2004/0031120 | A1* | 2/2004 | Cherian ........................ 15/227 |
| 2005/0125877 | A1* | 6/2005 | Benjamin et al. ............... 2/158 |
| 2005/0150784 | A1* | 7/2005 | Sanchez et al. ............. 206/205 |
| 2005/0231373 | A1 | 10/2005 | Lynn et al. |
| 2005/0282142 | A1 | 12/2005 | Lynn et al. |
| 2006/0029921 | A1* | 2/2006 | Walther et al. ............... 434/382 |
| 2006/0231568 | A1 | 10/2006 | Lynn et al. |
| 2006/0245814 | A1 | 11/2006 | Papa et al. |
| 2007/0006985 | A1 | 1/2007 | Lee |
| 2007/0045334 | A1 | 3/2007 | Sherman et al. |
| 2007/0118943 | A1* | 5/2007 | Stockhamer ........................ 2/1 |
| 2007/0142263 | A1 | 6/2007 | Stahl et al. |
| 2008/0053860 | A1 | 3/2008 | McDonald |
| 2008/0145826 | A1 | 6/2008 | Cohen et al. |
| 2008/0268405 | A1 | 10/2008 | Cohen et al. |
| 2008/0270240 | A1* | 10/2008 | Chu ................................ 705/14 |
| 2009/0184132 | A1* | 7/2009 | Walther et al. ................. 222/78 |

FOREIGN PATENT DOCUMENTS

| | | |
|---|---|---|
| KR | 10-2001-0079047 A | 8/2001 |
| KR | 10-2003-0091123 A | 12/2003 |
| WO | WO 02/086842 A1 | 10/2002 |
| WO | WO 2005/117672 A1 | 12/2005 |

OTHER PUBLICATIONS

TAPPI Official Test Method T 402 om-93, "Standard Conditioning and Testing Atmospheres For Paper, Board, Pulp Handsheets, and Related Products," published by the TAPPI Press, Atlanta, Georgia, revised 1993, pp. 1-3.

TAPPI Official Test Method T 410 om-98, "Grammage of Paper and Paperboard (Weight Per Unit Area)," published by the TAPPI Press, Atlanta, Georgia, revised 1998, pp. 1-5.

TAPPI Official Test Method T 411 om-89, "Thickness (Caliper) of Paper, Paperboard, and Combined Board," published by the TAPPI Press, Atlanta, Georgia, revised 1989, pp. 1-3.

* cited by examiner

HYGIENE TRAINING DEVICE AND METHOD

BACKGROUND

The benefits of proper nasal discharging (i.e., blowing one's nose) into a facial tissue are well documented. This is particularly important during cold and flu season. However, despite the known benefits, not all people regularly and properly utilize a facial tissue for nasal hygiene, particularly nasal discharge. This is particularly true with children who may not yet be trained, or may not be motivated, to properly blow their nose into a facial tissue. As such, children often resort to wiping their nose with their hand or on their shirt sleeve, or only using a small portion of the facial tissue sheet, such as a corner section, thus not catching all of the exudate, or spreading the exudate to other items that they later touch.

To help a child with the training and/or motivation process, a parent or other caregiver may verbally instruct the child on how to properly use a facial tissue for nasal discharge hygiene. However, while parental supervision and coaching can improve the child's nasal discharge habits, parents or caregivers are not always able to be with the child when nasal discharge is desired.

Several products have been introduced which provide children with instructions for using certain hygiene products, such as how a bathing mitt works, or for obtaining a desired amount of bathroom tissue. However, none of these products provides interactive training between the child and the device regarding how to properly use a facial tissue for nasal discharge hygiene, while at the same time providing motivation to do so.

Therefore, there remains a need for a system of training users in proper nasal discharge hygiene that is interactive and that can provide motivation.

SUMMARY

In response to the needs discussed above, the present invention provides training devices and methods that assist in training users on proper nasal hygiene. The devices and methods of the present invention provide interactive training for the user, while creating a game-like atmosphere which in turn provides motivation to properly use, or interact with, a facial tissue sheet for nasal hygiene. In addition, the devices and methods of the present invention help assure the caregiver that the user has properly utilized a facial tissue for nasal hygiene. Furthermore, the devices and methods of the present invention provide a means for developing, such as in a child, independent nasal hygiene habits while providing the caregiver with the same assurance as would be received by direct supervision of the child when blowing the nose.

In some aspects, a training device for nasal hygiene comprises a facial tissue sheet; wherein the facial tissue sheet has a first side, and wherein the facial tissue sheet also has a second side having an opposing planar relationship to the first side. A first-side tissue graphic is visible on the first side of the facial tissue sheet. The first-side tissue graphic comprises a permanent graphic and/or an active graphic. In addition, the first-side tissue graphic is a training mark. In some aspects, the training device comprises both a permanent graphic and an active graphic wherein the permanent graphic and the active graphic are thematically related. In other aspects, the first-side tissue graphic directs the user to a target zone on the facial tissue sheet. In still other aspects, the first-side tissue graphic is disposed on an inner substrate layer of the facial tissue sheet.

In some aspects, the training device further comprises a second-side tissue graphic that is visible on the second side of the facial tissue sheet. In some aspects, the second-side tissue graphic comprises a permanent graphic and/or an active graphic. In other aspects, the second-side tissue graphic is a training mark.

In some aspects, the training device further comprises a container. In other aspects, the container comprises a graphic design thematically related to the first-side tissue graphic. In still other aspects, the container is reusable. In yet other aspects, a plurality of the facial tissue sheets are stacked together within the container. In still other aspects, the plurality of facial tissue sheets are arranged so as to be dispensed one at a time from the container. In particular aspects, the plurality of facial tissue sheets comprises a series of training marks that are each different. In other aspects, the training marks are thematically related.

In some aspects, the training device further comprises a score card. In other aspects, the training device further comprises a wastebasket interactive object. In particular aspects, the wastebasket interactive object is thematically related to the first-side tissue graphic. In other aspects, the training device further comprises a wastebasket interactive object that is thematically related to the second-side tissue graphic.

In some aspects, a method of providing a system for nasal discharge training comprises: (A) providing a facial tissue sheet having a first side, and a second side in opposing planar relationship to the first side; (B) disposing a first-side tissue graphic onto the first side of the facial tissue sheet; and (C) enabling the user to properly utilize the facial tissue sheet for nasal discharge; wherein the first-side tissue graphic comprises a permanent graphic and/or an active graphic; and wherein the first-side tissue graphic is a training mark.

In some aspects, the method further comprises the step of disposing a second-side tissue graphic onto the second side of the facial tissue sheet, wherein the second-side graphic is visible on the second side, and wherein the second-side tissue graphic is a training mark. In other aspects, the method further comprises the step of providing a container for the facial tissue sheet. In still other aspects, the method further comprises the step of providing a score card. In yet other aspects, the method further comprises the step of providing a wastebasket interactive object. In still other aspects, the method further comprises the step of providing a set of caregiver instructions.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 1:
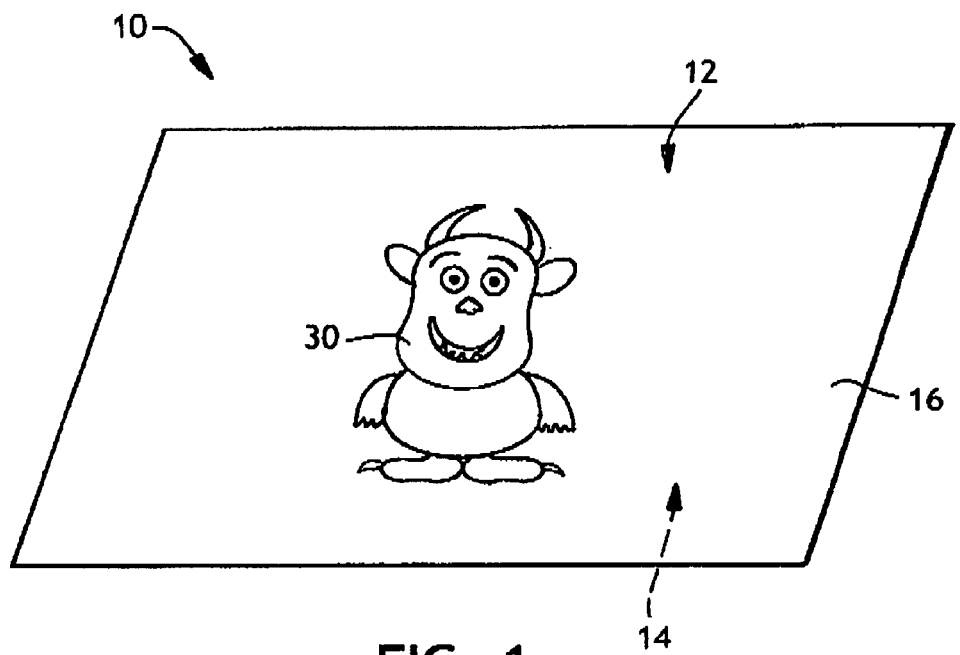
FIG. 1 is a perspective view of a facial tissue sheet of the present invention comprising a single tissue substrate layer.

Repeated use of reference characters in the present specification and drawings is intended to represent the same or analogous features or elements of the present invention.

DEFINITIONS

It should be noted that, when employed in the present disclosure, the terms "comprises," "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

When introducing elements of the present invention or the preferred embodiment(s) thereof, the articles "a", "an", "the" and "said" are intended to mean that there are one or more of the elements.

"Disposed," "disposed on," "disposed with," "disposed at," "disposed near" and variations thereof are intended to mean that one element can be integral with another element, or that one element can be a separate structure bonded to or placed with or placed near another element.

The term "and/or" is intended to mean the first element only, the second element only, or both elements together. For example, the phrase "X and/or Y" means that X only is present, or that Y only is present, or that both X and Y are present.

The term "active graphic" as used herein includes an appearing graphic, a fading graphic (also referred to as a disappearing graphic), a morphing graphic, or a combination thereof. The term "appearing graphic" is used herein to refer to a graphic that becomes visible or becomes significantly more visible when exposed to an initiator, such as nasal discharge. The terms "fading graphic" and "disappearing graphic" are used interchangeably herein to refer to a graphic that becomes invisible or significantly less visible when exposed to an initiator. The term "morphing graphic" refers to an active graphic that changes from one graphic depiction to another when exposed to an initiator.

The term "character graphic" is used herein to refer to a graphic containing an anthropomorphous image, and in particular an image having or suggesting human form or appearance which ascribes human motivations, characteristics or behavior to inanimate objects, animals, natural phenomena, cartoon characters, or the like. Ideally the character graphic would be suitable for children and could be utilized to motivate children to properly use a facial tissue. To that end, the character graphics can be associated with popular characters in the media, advertising or well known in a particular culture. In some aspects, the character graphics may include characters that the child or caregiver care about and want to identify with. In other aspects, the character graphics may be characters that the child wants to make go away. The character graphics can comprise permanent graphics, or active graphics, or both permanent and active graphics.

The term "disposable" is used herein to describe items that are not intended to be laundered or otherwise restored or reused after a single use.

The term "initiator" refers to a substance that may be applied to an active graphic disposed on a facial tissue sheet of the present invention which has the ability to activate the active graphic (e.g., cause a change such as appearing, fading or changing).

The term "nasal discharge" refers to substances that emanate from a nose.

The term "object graphic" refers to a graphic representing an object or thing, which can include an inanimate object.

The term "permanent graphic" is used herein to refer to a graphic that does not substantially change its degree of visibility when exposed to an initiator.

The term "target zone" refers to an area of the facial tissue sheet where it is particularly desirable for the majority of nasal discharge to initially be deposited by the user. For example, for a facial tissue sheet of the present invention, the target zone refers to the area located substantially in the center of the first side of the facial tissue sheet, and extending a distance equal to 25% of the total length and 25% of the total width of the sheet.

The term "training mark" refers to a visual indicia associated with a facial tissue sheet which directs a user to a location on the facial tissue sheet to accomplish a task related to nasal hygiene in a desired manner. In addition, a training mark provides motivation for a user to properly interact with the facial tissue sheet. Thus, a training mark provides interactive training for properly using a facial tissue sheet for nasal hygiene. A training mark includes a permanent graphic, an active graphic, or both, which induces the user to interact with a facial tissue sheet in a desired manner. A training mark can also be used to interactively train a user how to effect nasal discharge in a desired manner. In contrast, a training mark is not merely a set of instructions, such as a set of graphical instructions, which suggest how an item, such as a bath mitt, may be used. A training mark does not merely indicate the quantity of tissue to be utilized by a user, such as for bathroom tissue. A training mark is not merely an indicator of a previous event, such as urinating in a training pant. A training mark is not merely a print pattern which provides aesthetic value only, such as a floral pattern.

These terms may be defined with additional language in the remaining portions of the specification.

DETAILED DESCRIPTION

Provided is a training device for nasal hygiene for interactively training a user on proper nasal hygiene. Also included herein is a method of providing a system for nasal discharge training. As will become clear hereinafter, the training device and method of the present invention introduces the user to a nasal discharge training program through a fun (i.e., motivational) and interactive device and system. The intent and purpose of the device and method is to generate an interactive, game-type of environment which, often unknowingly to the user, imparts to the user the knowledge, training and advantages of properly using a facial tissue for nasal hygiene.

As part of the invention, a training device for nasal hygiene and method are provided comprising a facial tissue sheet, where the facial tissue sheet has a first side, and also has a second side which has an opposing planar relationship to the first side of the facial tissue sheet. A "first-side tissue graphic" is visible on the first side of the facial tissue sheet. As used herein, the term "visible" refers to the ability of a person having 20/20 vision to discern at arm's length in an environment providing 30 footcandles (320 Lux) of illumination the depiction of a graphic. The first-side tissue graphic can comprise a permanent graphic and/or an active graphic. Desirably, the first-side tissue graphic is a training mark.

For ease of explanation, the description hereafter will be in terms of a child who is learning how to properly blow his or her nose using a facial tissue sheet. However, this is not meant to limit the invention to children at this age or stage of life. It is understood that the invention also applies to, but is not limited to, persons with cognitive delays, persons who know how to properly use a facial tissue but lack adequate motivation, persons learning how to effect mucous discharge from their nose, and the like. It is also understood that the invention may apply to blowing a nose, wiping a nose, and the like.

Figure 2:
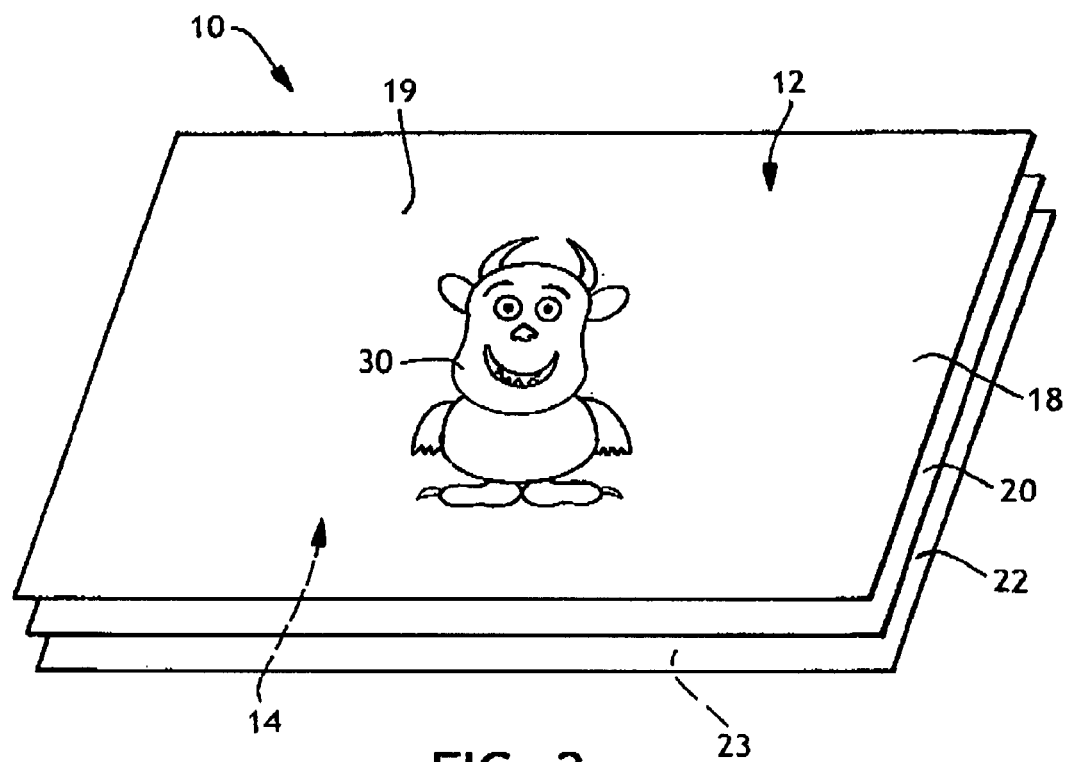
FIG. 2 is a perspective view of a facial tissue sheet of the present invention comprising multiple tissue substrate layers.

With reference to FIG. 1 and FIG. 2, a facial tissue training device is provided comprising a facial tissue sheet 10. The sheet 10 has a first side 12 and a second side 14, where the second side 14 is in an opposing planar relationship to the first side 12 of the sheet 10. The sheet 10 may include a single tissue substrate layer 16 as seen in FIG. 1, or may comprise multiple tissue substrate layers 18, 20, 22 as seen in FIG. 2. In the case where the facial tissue sheet comprises more than one tissue substrate layer, the outward-facing portion 19 of the top layer 18 would indicate the first side 12 and the outward-facing portion 23 of the bottom layer 22 would indicate the second side 14. The layers may or may not be permanently attached to each other. Also, for purposes of the present invention, a folded sheet would be considered as having multiple layers.

Facial tissue is well known in the art. Any of a variety of facial tissue products and styles may be utilized for the invention, including but not limited to single-ply, multi-ply and folded sheets, as well as standard-size and pocket-packs, for example. One such suitable facial tissue sheet includes KLEENEX 280 2-ply tissues, available from Kimberly-Clark Corporation, having a place of business located in Neenah, Wis., U.S.A. Another suitable facial tissue sheet includes KLEENEX facial tissue pocket packs, also available from Kimberly-Clark Corporation.

In one aspect of the invention, and by way of example only, a suitable facial tissue substrate can have at least about 20 dry weight percent short fibers, more preferably at least about 40 dry weight percent short fibers, and still more preferably at least about 60 dry weight percent short fibers. Short fibers are natural or synthetic papermaking fibers having an average length of about 2 millimeters (0.08 inches) or less. Generally, short fibers include hardwood fibers such as eucalyptus, maple, birch, aspen and the like. In some aspects, the facial tissue substrate may include long fibers. Long fibers are natural or synthetic papermaking fibers having an average length of about 2.5 millimeters (0.1 inch) or greater. Such long fibers include softwood fibers such as pine, spruce and the like.

Other fibers are also suitable for the present invention. Other fibers include: vegetable fibers such as are generally comprised mainly of cellulose including cotton, linen, jute, flax, ramie, sisal, and hemp; seed fiber (i.e., fibers collected from seeds or seed cases, including cotton and kapok); leaf fiber (i.e., fibers collected from leaves, including sisal and agave); bast fiber or skin fiber, including jute, kenaf, industrial hemp, ramie, rattan, soybean fiber, and even vine fibers and banana fibers; fruit fiber (i.e., fibers collected from the fruit of the plant, including coconut (coir) fiber); stalk fiber (i.e., fibers that are actually the stalks of the plant, including straws of wheat, rice, barley, and other crops including bamboo and grass); animal fibers which generally comprise proteins, including silk, wool, angora, mohair and alpaca; animal hair (i.e., wool or hairs including sheep's wool, goat hair (alpaca, Cashmere), horse hair, etc.); silk fiber (i.e., fiber collected from dried saliva of bugs or insects during the preparation of cocoons, including silk from silk worms); avian fiber (i.e., fibers from birds, including feathers and feather fiber; common synthetic fibres including rayon, acetate, nylon, polyamide, modacrylic, polyolefin, acrylic, polyester, PLA, and lyocell.

In some aspects, the basis weight of the tissue substrate can be from about 5 grams per square meter ($g/m^2$) to about 100 $g/m^2$, such as from about 10 $g/m^2$ to about 70 $g/m^2$, or from about 20 $g/m^2$ to about 50 $g/m^2$. The basis weight and bone dry basis weight of the tissue substrate layer specimens are determined using the TAPPI T410 procedure or a modified equivalent such as: Tissue samples are conditioned at 23°

C.+/−1° C. and 50+/−2% relative humidity for a minimum of 4 hours. After conditioning, a stack of sixteen (16)—3 inch×3 inch (7.6 cm×7.6 cm) samples is cut using a die press and associated die. This represents a tissue sheet sample area of 144 in² (929 cm²). Examples of suitable die presses are a TMI DGD die press manufactured by Testing Machines, Inc. (having a place of business located in Islandia, N.Y., U.S.A.), or a Swing Beam testing machine manufactured by USM Corporation (having a place of business located in Wilmington, Mass., U.S.A.). Die size tolerances are ±0.008 inches (0.02 cm) in both directions. The specimen stack is then weighed to the nearest 0.001 gram on a tared analytical balance. The basis weight in grams per square meter is calculated using the following equation:

Basis weight=stack wt. in grams/0.0929

In some aspects, the tissue substrate may also be characterized in part by a machine-direction stretch of less than about 30 percent, such as from about 10 to about 25 percent, or from about 15 to about 20 percent. The substrate may additionally be calendered or embossed as desired.

In general, tissue products can be differentiated from other paper products in terms of their bulk. The bulk of the tissue products of the present invention may be calculated as the quotient of the caliper expressed in microns, divided by the basis weight, expressed in grams per square meter. The resulting bulk is expressed as cubic centimeters per gram. For example, writing papers, newsprint and other such papers have higher strength, stiffness and density (low bulk) in comparison to tissue products of the present invention which tend to have much higher calipers for a given basis weight. In some aspects, a facial tissue substrate of the present invention can have a bulk that can range between about 2 cubic centimeters per gram ($cm^3/g$) to about 20 $cm^3/g$, such as between about 3 $cm^3/g$ to about 20 $cm^3/g$, or between about 4 $cm^3/g$ to about 18 $cm^3/g$.

The bulk of the individual substrate layers making up the facial tissue sheet of the present invention may or may not be the same. However, in some aspects, each of the individual layers making up the facial tissue sheet will desirably have a bulk greater than about 2 $cm^3/g$, such as about 3 $cm^3/g$ to about 24 $cm^3/g$, or from about 4 $cm^3/g$ to about 16 $cm^3/g$.

Tissue substrate layer bulk is calculated by taking the single layer caliper and dividing by the conditioned basis weight of the product. The term "caliper" as used herein is the thickness of a single tissue substrate layer, and may either be measured as the thickness of a single tissue substrate layer or as the thickness of a stack of ten tissue substrate layers and dividing the ten-layer thickness by ten, where each substrate layer within the stack is placed with the same side up.

In some aspects, the tissue substrate layers can comprise a desirable caliper. Caliper is desirably expressed in microns. Caliper is measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board" optionally with Note 3 for stacked tissue substrate layers. The micrometer used for carrying out T411 om-89 is a Bulk Micrometer (TMI Model 49-72-00 (having a place of business located in Amityville, N.Y., U.S.A.) or equivalent having an anvil diameter of 4 1/16 inches (103.2 millimeters) and an anvil pressure of 220 grams/square inch (3.3 g kilo Pascals.) For the products of the present invention, the single tissue substrate layer bulk can be determined by de-plying the sheets before measuring the caliper and basis weight as defined.

In some aspects, the facial tissues can range in size from about 25 in² to about 100 in² (64 cm²-254 cm²) such as between 40 in² to about 80 in² (102 cm²-203 cm²). In other aspects, the minimum size in any one direction can be about 4 inches (10 cm). For tissue targeted to children, it may be advantageous in some aspects to use smaller sized sheets of tissue such as between about 25 in to about 60 in² (64 cm²-152 cm²).

It is understood that the above description is provided for exemplary purposes only, and should not be construed as limiting the facial tissue sheets that are suitable for the present invention in any manner.

Referring to FIGS. 1 and 2, in one aspect of the invention, a training mark 30 is disposed on the first side 12 of the tissue sheet 10. The training mark 30, as defined above, includes at least one graphic. In general, graphics of the interactive tissue of the present invention can include at least one permanent graphic and/or at least one active graphic.

The term "permanent graphic" is used herein to refer to a graphic that does not substantially change its degree of visibility when exposed to an initiator, such as nasal discharge. The change in visibility of a graphic or a portion of a graphic can be determined based on a person's observation of the graphic before and after the tissue substrate layer containing the graphic is exposed to an initiator (e.g., nasal discharge, such as mucous). Changes in the visibility of the graphic should be identified and distinguished where necessary from changes in the color of other materials, such as fluff pulp for example, within the facial tissue. Desirably, the permanent graphic can be configured so that the entire graphic also does not substantially change its appearance, size or shape when the product is exposed to the initiator.

In contrast to permanent graphics, an active graphic can comprise a fading, appearing or morphing graphic. In some aspects, the active graphic can be formed from a thermochromatic dye. In other aspects, the active graphic can be formed from an ink that is soluble in aqueous solutions, such as nasal discharge. The active graphic is referred to as "active" because it is constructed to disappear, appear or morph in view, particularly when the child discharges nasal exudates into the tissue and onto the graphic. "Appearing graphics" can appear into view, relative to the exterior surface of the tissue. "Fading graphics," or "disappearing graphics," can simply disappear or substantially fade from view, relative to the exterior surface of the tissue. "Morphing graphics" can change from one graphic depiction to another.

The active graphic desirably becomes active upon exposure to any variety of intiators which effects a change in, for example, wetness, temperature, salt concentration or pH of the graphic. In particular aspects, it is desirable that the initiator is nasal discharge, and more particularly mucous. In one aspect, thermochromatic ink is positioned in the facial tissue so that when the initiator is applied to the graphic, the heat of the initiator causes a color change to occur.

For example, there are two types of thermochromic inks: liquid crystals and leucodyes. In some aspects, leucodye thermochromics can be particularly desirable. Leucodyes may be applied to substrates such as tissue products by standard printing techniques including, but not limited to, rotogravure, flexographic and ink jet printing. In its cool state, a leucodye exhibits color, and when warmed, it turns clear or translucent. In some aspects, it takes a 5-10° F. (3-6° C.) shift to bring about a change in color.

In some aspects, leucodye thermochromic inks can be made to change from one color to another, rather than transitioning from colored to clear. This can be achieved with an ink that combines a leucodye with a permanent-colored ink formulation. For example, a green ink can be formulated by adding a blue leucodye to a yellow ink. In its cool state, the printed ink layer is green, and once warmed, it reverts to yellow as the leucodye becomes clear or translucent. A wide range of colors are also available, but are not critical to the present invention.

In general, leucodyes can be designed to change at various temperature ranges, from as low as −13° F. (−25° C.) up to 150° F. (66° C.). In one aspect, the thermochromic leucodyes can have a reference temperature of 28° F.-90° F. (−2° C.-32° C.). As used herein, reference temperature is defined by the beginning of the color apparition when temperature goes down. Suitable thermochromic inks include THERMASOLV and THERMASOFT inks available from Sun Chemical.

In some aspects of the present invention, ink is positioned in the facial tissue so that it becomes wet and dissolves when the product is insulted with nasal discharge. In some aspects concerning disappearing active graphics, the ink can dissolve and disperse into the tissue and is obscured by the tissue substrate. As a result, the active graphic seems to disappear from view.

Suitable inks are available from a variety of commercial vendors, such as Sun Chemical Corporation (having a place of business located in Philadelphia, Pa., U.S.A.) and includes trade designation AQUA DESTRUCT. Soluble compositions are disclosed in U.S. Pat. No. 4,022,211 issued May 10, 1977 to Timmons et al., which is incorporated herein by reference in a manner that is consistent herewith. The ink color can be selected to provide a pleasing appearance and graphic impact, including fading rapidly upon contact with the initiator. For example, in one aspect, to facilitate rapid fading, the fading graphics can comprise line drawings having a line width of from about 1 to about 2 millimeters.

The active graphic can also comprise a fading, morphing or appearing graphic which is formed from other compositions that change color when exposed to an initiator. A color change composition can be adapted to merely change color (e.g., for appearing graphics or morphing graphics), or to blend in with a background or surrounding color (e.g., for disappearing or morphing graphics), either before or after exposure to the initiator. Suitable compositions of this color-change type are available from a variety of commercial vendors, such as a pH-change/color-change hot melt adhesive available from Findley Adhesives, Inc. (having a place of business located in Wauwatosa, Wis., U.S.A.). Other examples include food colorings or food dyes, such as FD&C Blue #1. Alternatively, the active graphic can comprise pH sensitive inks, fugitive inks, colored absorbent particles, hydratable salts, moisture sensitive films, enzymes, heat sensitive inks and dyes, or the like.

In some aspects, the first-side graphic of the present invention may include a "character graphic". In some aspects, the character graphic may be a permanent graphic. In other aspects, the character graphic may be an active graphic. In still other aspects, the character graphic may be a combination of a permanent graphic and an active graphic. The role of the character graphic can be to help motivate the child to properly use a facial tissue sheet for nasal discharge hygiene. The character graphic can also give parents and caregivers an interactive element for nasal discharge training. One aspect comprises a permanent character graphic that cannot complete some action or observation without help from the child. This facilitates nonthreatening and gentle communications between the child and caregiver, as well as interaction between the child and the tissue sheet, when the child is in need of nasal discharge. The character graphic can become a third party that the caregiver can use to deflect the resistance from a child to the caregiver's authority, while still communicating the desire that the child properly use a facial tissue for nasal discharge hygiene. It may be easier for the child to perform proper nasal discharge using a facial tissue when the circumstances seem to be focused on a third party. It may also be less stressful for the caregiver because he or she may not need to directly confront the child over the issue. Similarly, the character graphic may provide a source of comfort for the child as a buddy who reduces stress during the training period.

Suitable character graphics can include animals, people, inanimate objects, natural phenomena, cartoon characters, or the like that may or may not be provided with human features such as arms, legs, facial features or the like. For purposes of nasal discharge hygiene training, it may be desirable for the character graphic to be familiar to the child, such as an identifiable cartoon character. The character graphics may be a type that the child can relate to, examples of which could include animals, toys, licensed characters, or the like. Character graphics can be made more personable and friendly to the child by including human-like features, human-like expressions, apparel, abilities, or the like. By way of illustration, an animal character graphic can be shown smiling, wearing clothing, playing sports, fishing, driving, playing with toys, or the like. In some aspects, the character graphic can desirably be created to project an appearance that could be described as friendly, positive, non-intimidating, silly, independent, inspirational, active, expressive, dauntless and/or persevering, for example.

In some aspects, the first-side tissue graphic of the present invention may additionally, or alternatively, include an "object graphic". In some particular aspects, the object graphic may be a permanent graphic. In other particular aspects, the object graphic may be an active graphic. In still other aspects, the character graphic may be a combination of a permanent graphic and an active graphic. In some aspects, a character graphic may be interactively interrelated with an object graphic. As used herein, the term "interactively interrelated" is used to mean that the character graphic is illustrated to be involved in or performing an action or activity, and the object graphic is the object of or is associated with the action or activity. Without wishing to be limited to the specific embodiments listed, suitable examples of a character graphic interactively interrelated with an object graphic can include: the character graphic holding or using a racquet, bat, glove, other sporting equipment or the like and the object graphics comprising balls, related sporting equipment or the like; the character graphic illustrated on a soccer field, football field, basketball court or the like environment and the object graphics comprising balls, related equipment or toys; the character graphic holding a butterfly net or the like and the object graphics comprising butterflies or the like; the character graphic holding a fishing pole, sitting in a boat or the like and the object graphics comprising fish, inflatable water toys or the like; the character graphic holding flowers, plants, gardening tools or the like and the object graphics comprising flowers or plants; the character graphic feeding, training or nurturing the object graphics which comprise animals, plants or the like; the character graphic playing in a specific environment such as a doll house, barnyard or the like and the object graphics comprising dolls, animals or the like which are specifically adapted to the environment; the character graphic holding or using a telescope or the like and the object graphics comprising stars, planets or the like; the character graphic comprising a racecar and the object graphic comprising race flags; the character graphic comprising a submarine and the object graphic comprising fish, bubbles, shells or the like; the character graphic comprising a pet or other animal and the object graphics comprising dog bones, pet toys, food or the like; the character graphic comprising a large sandbox and the object graphic comprising toys in the sandbox; the character graphic comprising a dog near a large dog dish and the object graphic comprising the dog bones inside or near the dog dish; or other suitable interactively interrelated graphics.

As referenced above, the invention includes a first-side tissue graphic that is a training mark which facilitates the interactive nature of the invention. In some aspects, the first-side tissue graphic comprises at least one permanent graphic. In other aspects, the first-side tissue graphic comprises at least one active graphic. In still other aspects, the character graphic can include at least one permanent graphic and at least one active graphic. Thus the term "first-side tissue graphic" as used herein can comprise a single graphic or multiple graphics.

In some aspects, the permanent graphics of the invention may comprise character graphics and/or object graphics. Likewise, in some aspects, the active graphics of the invention may comprise character graphics and/or object graphics.

In some aspects, the first-side tissue graphic may be selected based on a theme. It is desirable that the theme is something which attracts the attention of the user. It is also desirable that the theme has the capability to provide a training mark.

Figure 3:
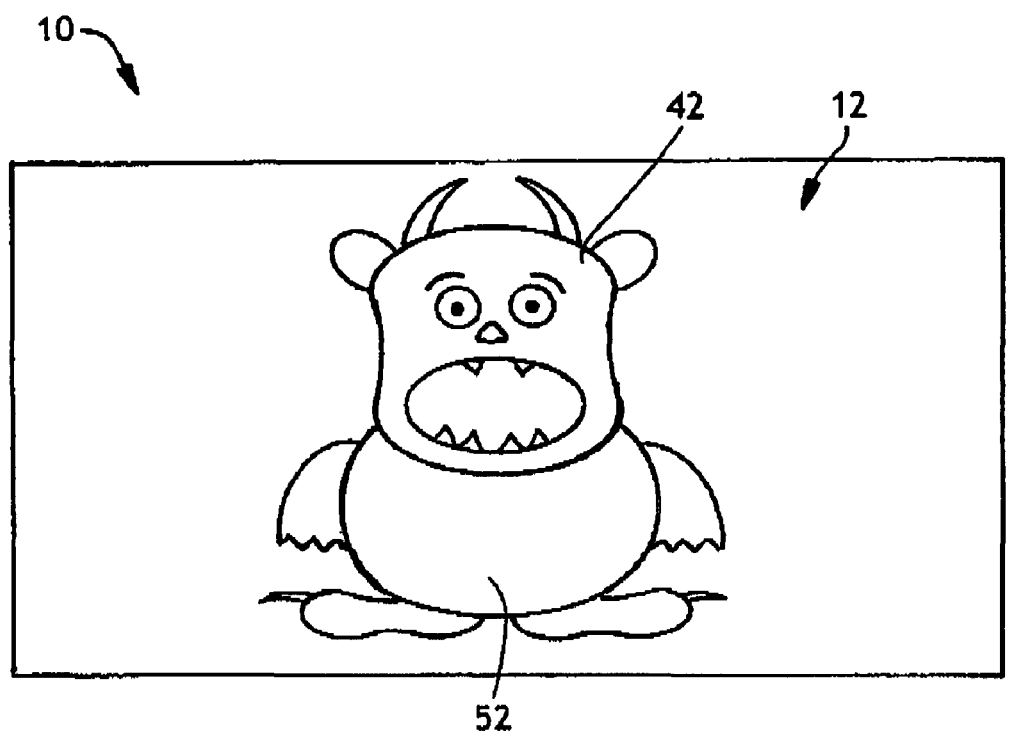
FIG. 3 illustrates an exemplary facial tissue sheet having a first-side graphic that is a permanent graphic.

By way of example, one such theme could relate to monsters. In this example, the first-side tissue graphic that is desirably a training mark could be disposed on a first-side of the tissue sheet as a single permanent graphic in the form of a friendly monster character. The monster could appropriately be named the "booger monster," a name which could immediately draw a child's attention. In addition, the monster could be depicted with its mouth open. Thus, when a child is in need of nasal discharge, the parent or caregiver could tell the child that: "It's time to feed the booger monster . . . " at which point the child would be motivated to properly interact with the facial tissue sheet by blowing as much nasal discharge as possible into the mouth of the monster, and thus also into the facial tissue sheet. The child is therefore motivated by the training mark to properly interact with the facial tissue sheet in order to obtain the reward of feeding the monster. FIG. 3 shows an exemplary first-side graphic 42 that is a permanent graphic 52 in the form of a monster which is visible on the first side 12 of the facial tissue sheet 10.

Figure 4A:
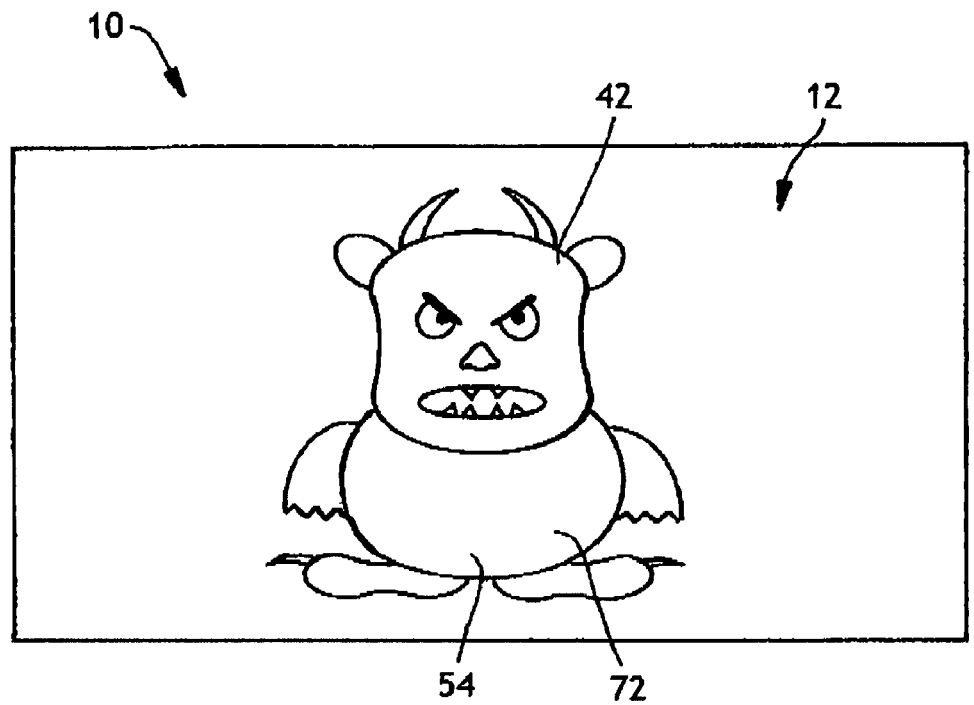
FIG. 4A illustrates an exemplary facial tissue sheet prior to nasal discharge having a first-side graphic that is an active graphic in the form of a disappearing graphic.
Figure 4B:
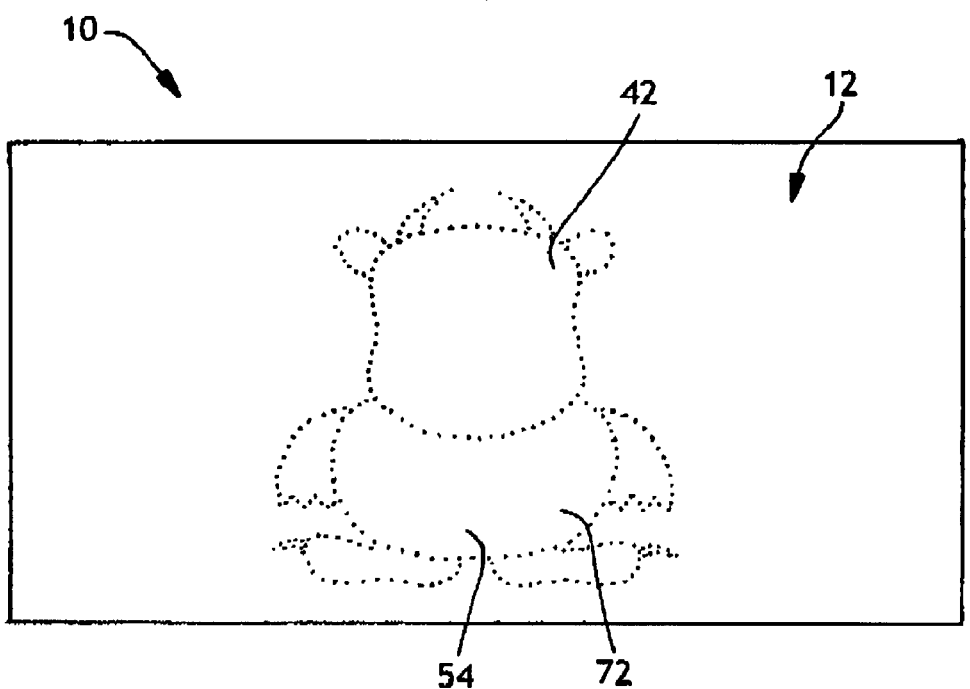
FIG. 4B illustrates an exemplary facial tissue sheet after nasal discharge having a first-side graphic that is an active graphic in the form of a disappearing graphic.

Continuing with the monster theme, in another aspect, a first-side tissue graphic could be disposed on a first-side of the facial tissue sheet as a single active graphic that is desirably a training mark and which comprises a disappearing graphic. In this example, the monster could be depicted as angry-looking, such that the child would be motivated to properly interact with the facial tissue sheet by blowing as much nasal discharge as possible onto the angry monster, and thus also into the facial tissue sheet, to make the angry monster disappear. The child is therefore motivated by the training mark to properly interact with the facial tissue sheet in order to obtain the reward of making the angry monster disappear. FIG. 4A illustrates an exemplary facial tissue sheet 10 prior to nasal discharge having a first-side graphic 42 that is an active graphic 54 in the form of a disappearing graphic 72 and which is visible on the first side 12 of the facial tissue sheet 10. FIG. 4B illustrates an exemplary facial tissue sheet 10 after nasal discharge having a first-side graphic 42 that is an active graphic 54 in the form of a disappearing graphic 72 and which is visible on the first side 12 of the facial tissue sheet 10.

Figure 5A:
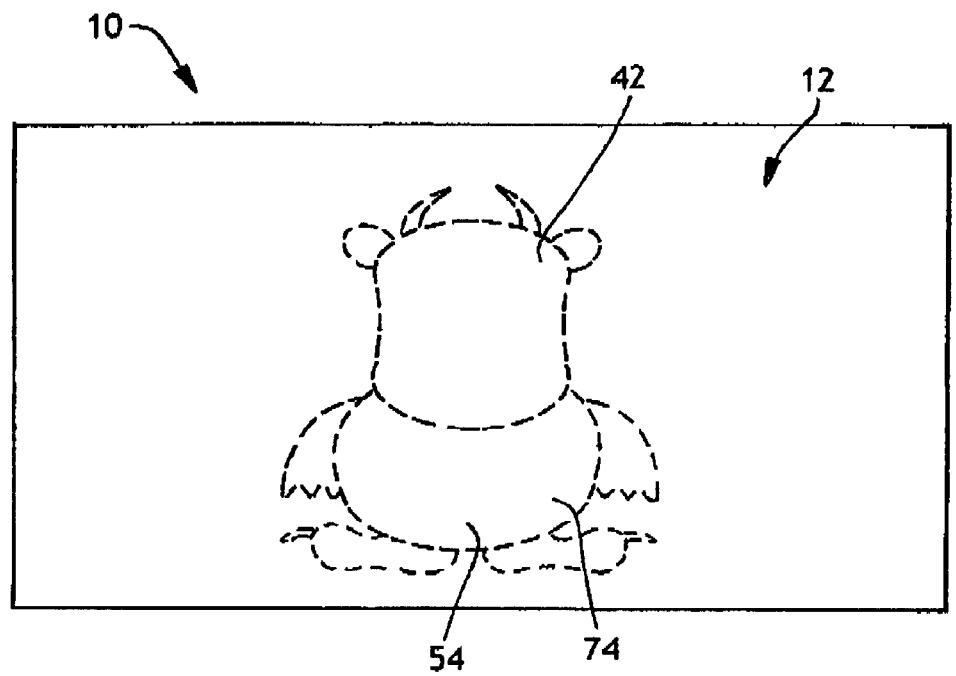
FIG. 5A illustrates an exemplary facial tissue sheet prior to nasal discharge having a first-side graphic that is an active graphic in the form of an appearing graphic.
Figure 5B:
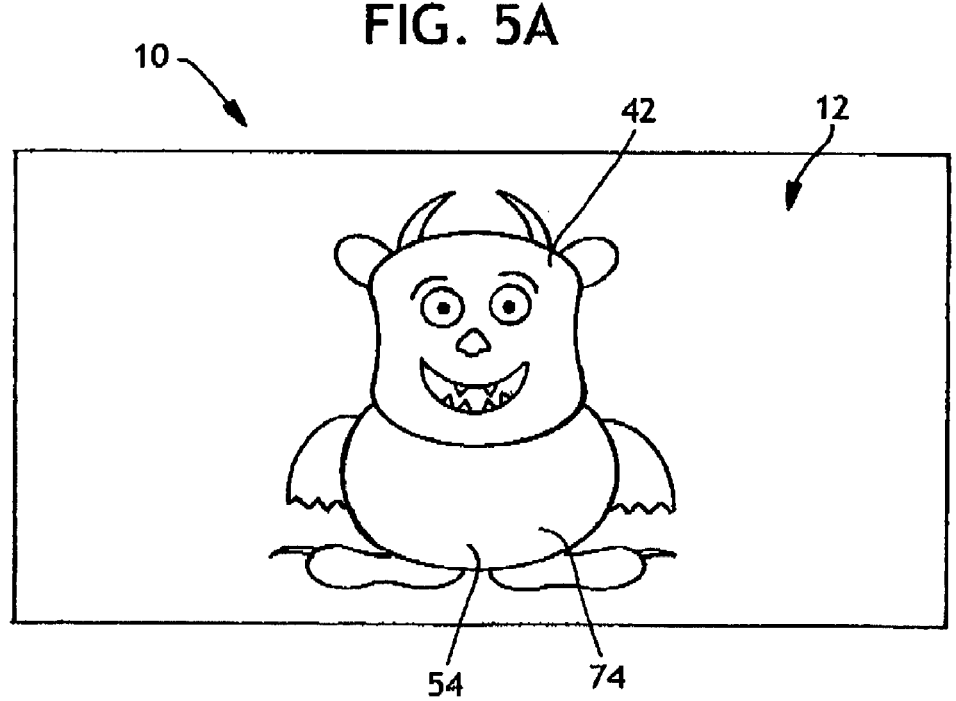
FIG. 5B illustrates an exemplary facial tissue sheet after nasal discharge having a first-side graphic that is an active graphic in the form of an appearing graphic.

Continuing with the monster theme, in another aspect, a first-side tissue graphic that is desirably a training mark could be disposed on a first-side of the facial tissue sheet as a single active graphic which comprises an appearing graphic. In this example, the first side of the tissue sheet could appear to comprise no graphic at all. The caregiver could then tell the child: "The monster is hiding, help me find it . . . " at which point the child would be motivated to properly interact with the facial tissue sheet by blowing as much nasal discharge as possible into the facial tissue sheet to make the monster appear. The child is therefore motivated by the training mark to properly interact with the facial tissue sheet in order to obtain the reward of making the monster appear in a particular location. FIG. 5A illustrates an exemplary facial tissue sheet 10 prior to nasal discharge having a first-side graphic 42 that is an active graphic 54 in the form of an appearing graphic 74 and which is visible on the first side 12 of the facial tissue sheet 10. FIG. 5B illustrates an exemplary facial tissue sheet 10 after nasal discharge having a first-side graphic 42 that is an active graphic 54 in the form of an appearing graphic 74 and which is visible on the first side 12 of the facial tissue sheet 10.

Figure 6A:
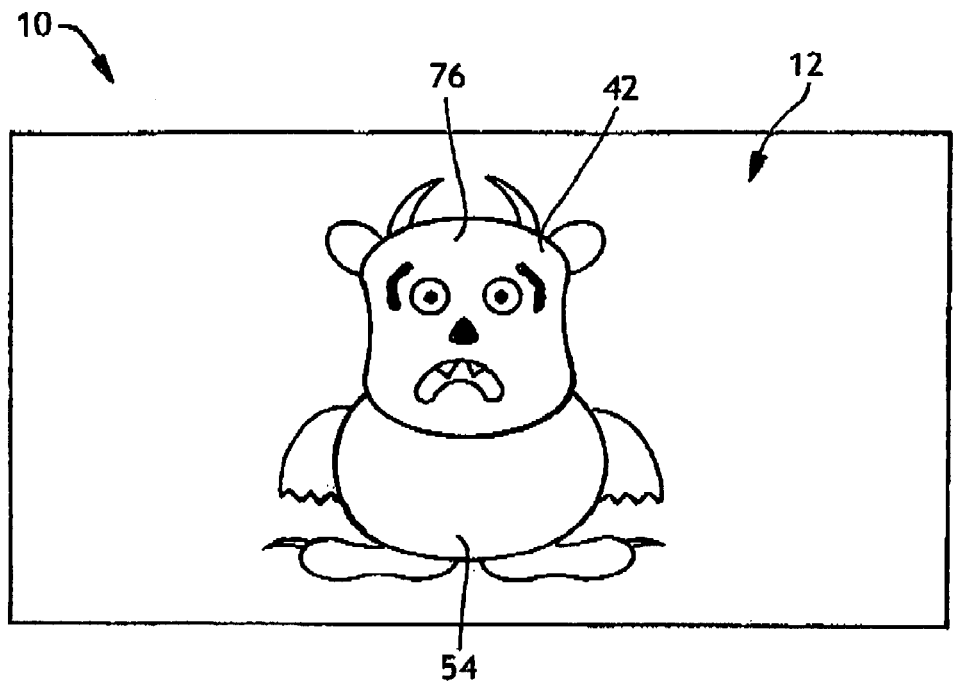
FIG. 6A illustrates an exemplary facial tissue sheet prior to nasal discharge having a first-side graphic that is an active graphic in the form of a morphing graphic.
Figure 6B:
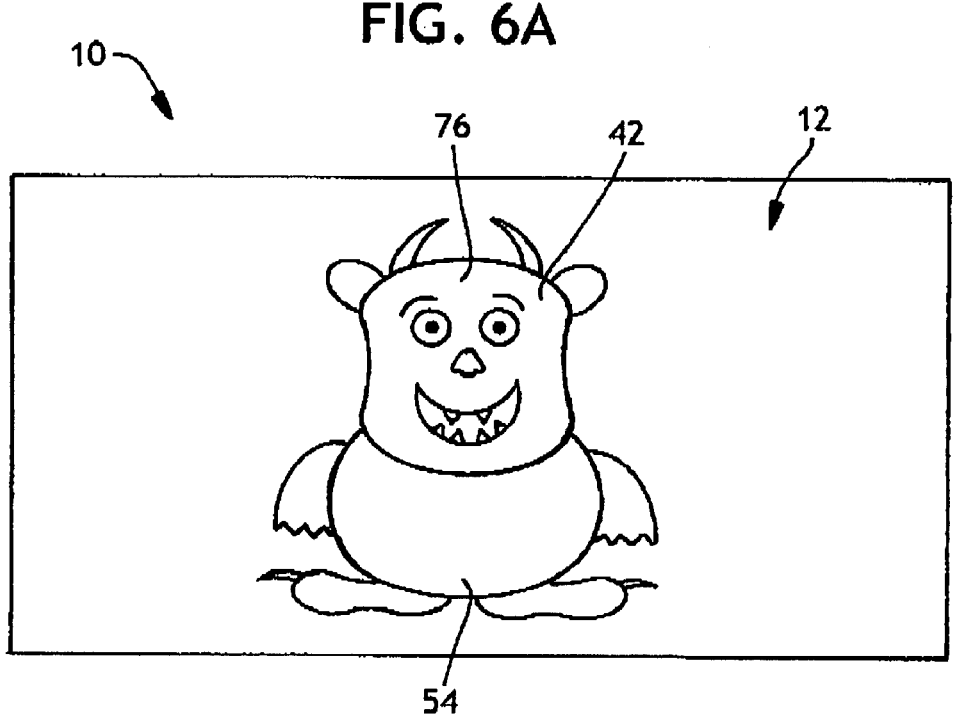
FIG. 6B illustrates an exemplary facial tissue sheet after nasal discharge having a first-side graphic that is an active graphic in the form of a morphing graphic.

Continuing with the monster theme, in another aspect, a first-side tissue graphic that is desirably a training mark could be disposed on a first-side of the facial tissue sheet as a single active graphic which comprises a morphing graphic. In this example, the monster could be depicted as a sad monster. The child would then be motivated to properly interact with the facial tissue sheet by blowing as much nasal discharge as possible onto the sad monster, and thus also into the facial tissue sheet, to make the monster's face change from sad to happy. The child is therefore motivated by the training mark to properly interact with the facial tissue sheet in order to obtain the reward of making the monster happy. FIG. 6A illustrates an exemplary facial tissue sheet 10 prior to nasal discharge having a first-side graphic 42 that is an active graphic 54 in the form of a morphing graphic 76 and which is visible on the first side 12 of the facial tissue sheet 10. FIG. 6B illustrates an exemplary facial tissue sheet 10 after nasal discharge having a first-side graphic 42 that is an active graphic 54 in the form of a morphing graphic 76 and which is visible on the first side 12 of the facial tissue sheet 10.

Figure 7A:
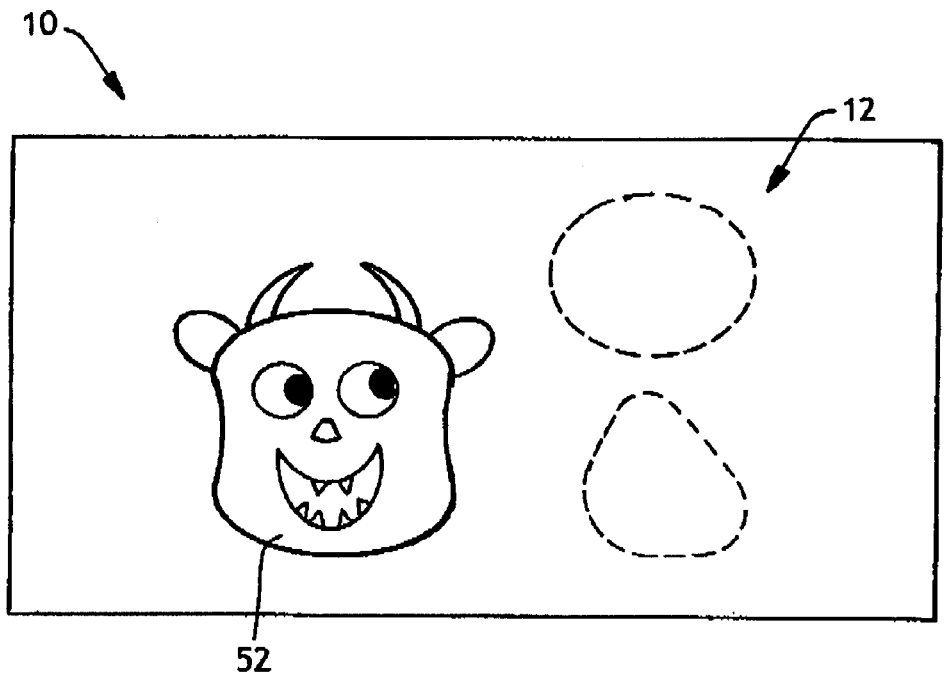
FIG. 7A illustrates an exemplary facial tissue sheet prior to nasal discharge having a first-side graphic that comprises a permanent graphic and an active graphic in the form of an appearing graphic.
Figure 7B:
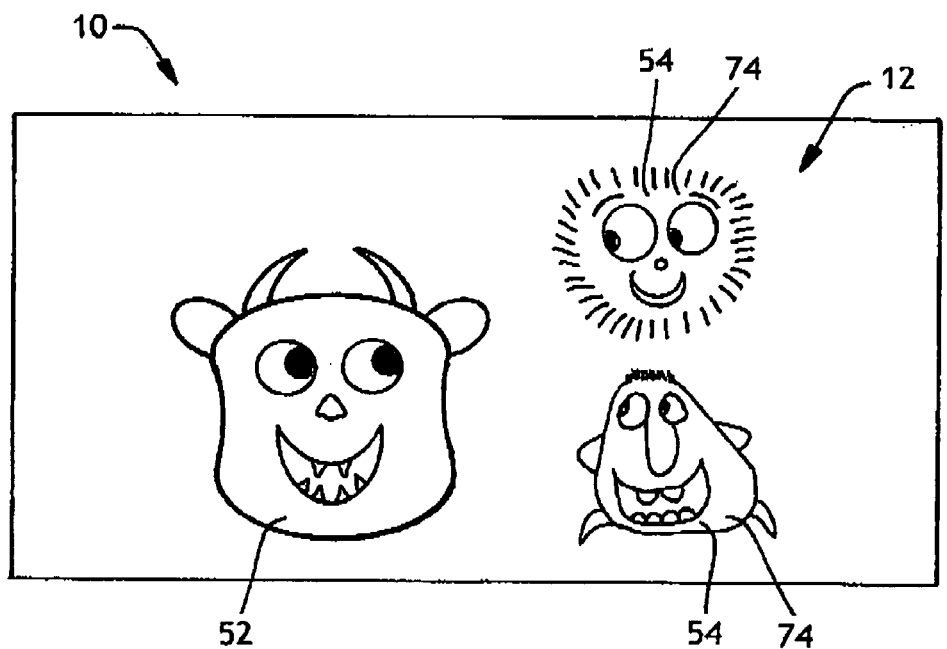
FIG. 7B illustrates an exemplary facial tissue sheet after nasal discharge having a first-side graphic that comprises a permanent graphic and an active graphic in the form of an appearing graphic.

Continuing with the monster theme, in another aspect, a first-side tissue graphic that is desirably a training mark could be disposed on a first-side of the tissue sheet comprising at least one permanent graphic and at least one active graphic. In this example, the monster could be depicted as a monster that is searching for its friends. The child would then be motivated to properly interact with the facial tissue sheet by blowing as much nasal discharge as possible onto the searching monster, and thus also into the facial tissue sheet, to make several monster friends appear. The child is therefore motivated by the training mark to properly interact with the facial tissue sheet in order to obtain the reward of making the monster's friends appear. FIG. 7A illustrates an exemplary facial tissue sheet 10 prior to nasal discharge having a first-side graphic 42 that comprises a permanent graphic 52 and an active graphic 54 in the form of an appearing graphic 74 and which is visible on the first side 12 of the facial tissue sheet 10. FIG. 7B illustrates an exemplary facial tissue sheet 10 after nasal discharge having a first-side graphic 42 that comprises a permanent graphic 52 and an active graphic 54 in the form of an appearing graphic 74 and which is visible on the first side 12 of the facial tissue sheet 10.

Figure 8A:
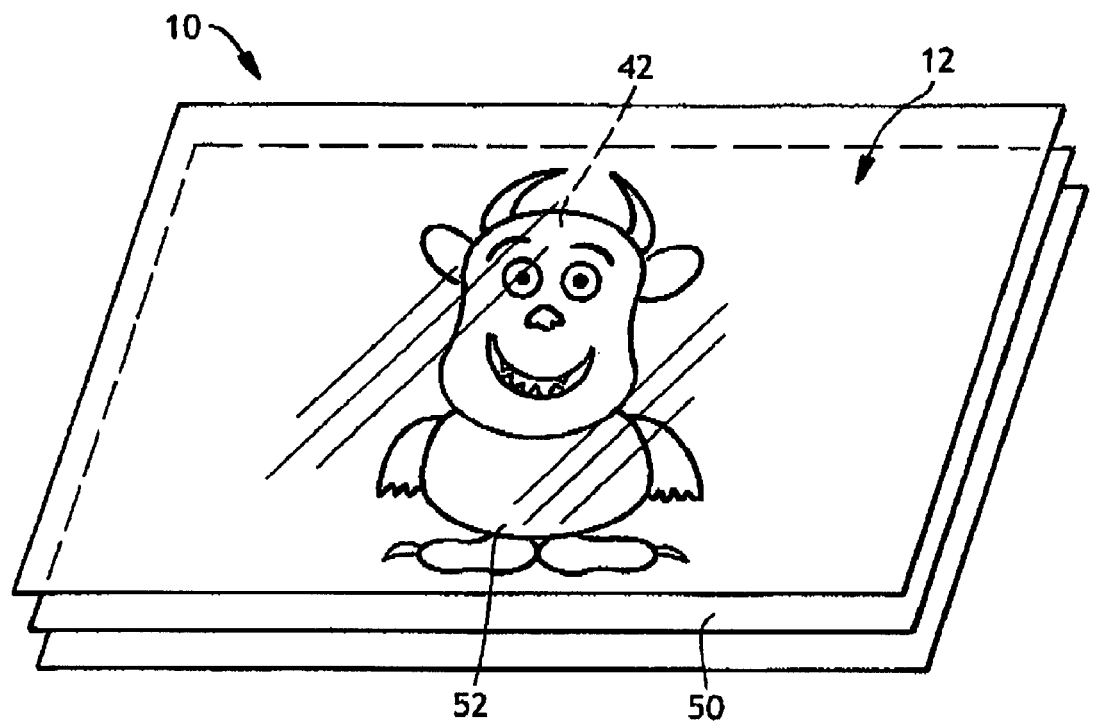
FIG. 8A illustrates an exemplary facial tissue sheet prior to nasal discharge having a first-side graphic that comprises a permanent graphic disposed on an inner tissue substrate layer.
Figure 8B:
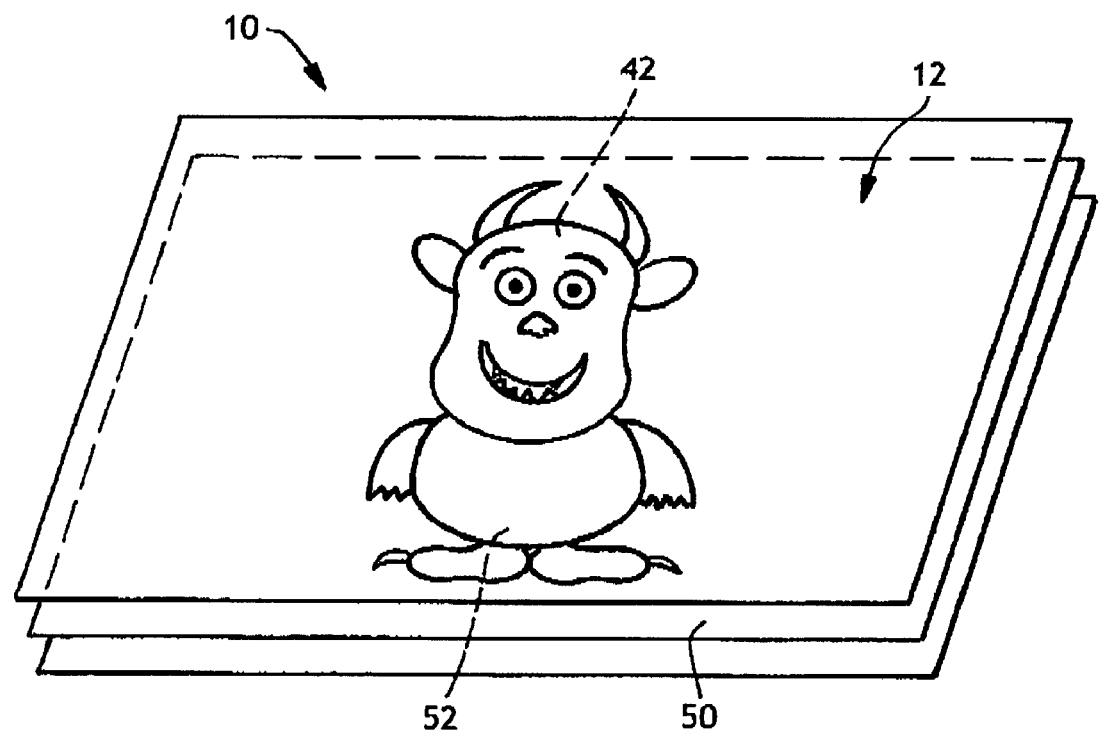
FIG. 8B illustrates an exemplary facial tissue sheet after nasal discharge having a first-side graphic that comprises a permanent graphic disposed on an inner tissue substrate layer.

Continuing with the monster theme, in another aspect, a first-side tissue graphic that is desirably a training mark could be disposed on an inner tissue substrate layer of a facial tissue sheet having multiple layers. In this example, a friendly monster is visible on the first-side of the facial tissue sheet, but somewhat obscured prior to nasal discharge due to having one or more tissue substrate layers located between the graphic and the outer surface of the first side. The application of nasal discharge onto the one or more tissue substrate layers located between the graphic and the outer surface of the first side can make the layer(s) translucent, thus the graphic image becomes clearer and/or sharper. The child would then be motivated to properly interact with the facial tissue sheet by blowing as much nasal discharge as possible onto the monster, and thus also into the facial tissue sheet, to enhance the appearance of the monster. In some aspects, the graphic is desirably a permanent graphic. The child is therefore motivated by the training mark to properly interact with the facial tissue sheet in order to obtain the reward of making the monster appear sharper and/or clearer. FIG. 8A illustrates an exemplary facial tissue sheet 10 prior to nasal discharge having a first-side graphic 42 that comprises a permanent graphic 52 disposed on an inner tissue substrate layer 50 and which is visible on the first side 12 of the facial tissue sheet 10. FIG. 8B illustrates an exemplary facial tissue sheet 10 after nasal discharge having a first-side graphic 42 that comprises a permanent graphic 52 disposed on an inner tissue substrate layer 50 and which is visible on the first side 12 of the facial tissue sheet 10.

Although a monster theme has been provided for exemplary purposes only, it is understood that the number of themes could be virtually infinite. For example, other themes could result in graphics such as: a camp fire where the child puts out a fire; a web with a spider man character in which little bugs could appear on the web; a bullseye target in which score numbers appear based on how close the child gets to the bullseye, or based on how much area of the target is covered by the quantity of nasal discharge. In some aspects, the theme can include a story line in which the first-side graphic illustrates a character performing an activity involving an active object graphic. In this way, the invention may permit the caregiver to interact with the child regarding the story line created by the graphics and may provide an opportunity for the caregiver to teach the child important lessons regarding nasal discharge training due to the active nature of the graphics. More specifically, the parent or caregiver can use the graphic story-line to make up a game or story for the purpose of facial tissue training progress. Regardless of the theme(s) selected for the invention, it is desirable that the first-side tissue graphic, when taken as a whole, functions as a training mark.

Figure 9:
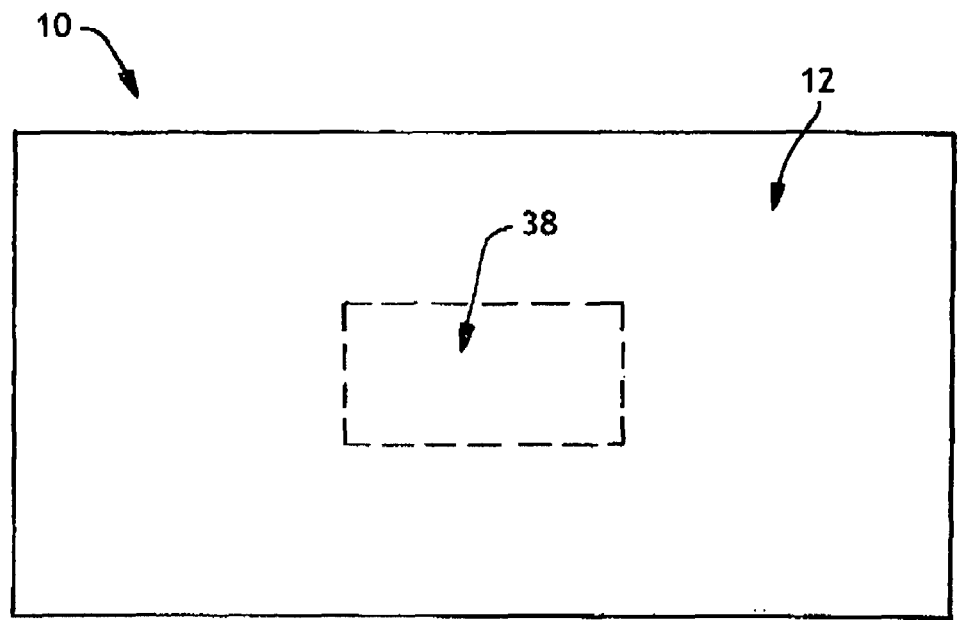
FIG. 9 is a facial tissue sheet of the present invention depicting the location of a target zone.
Figure 10:
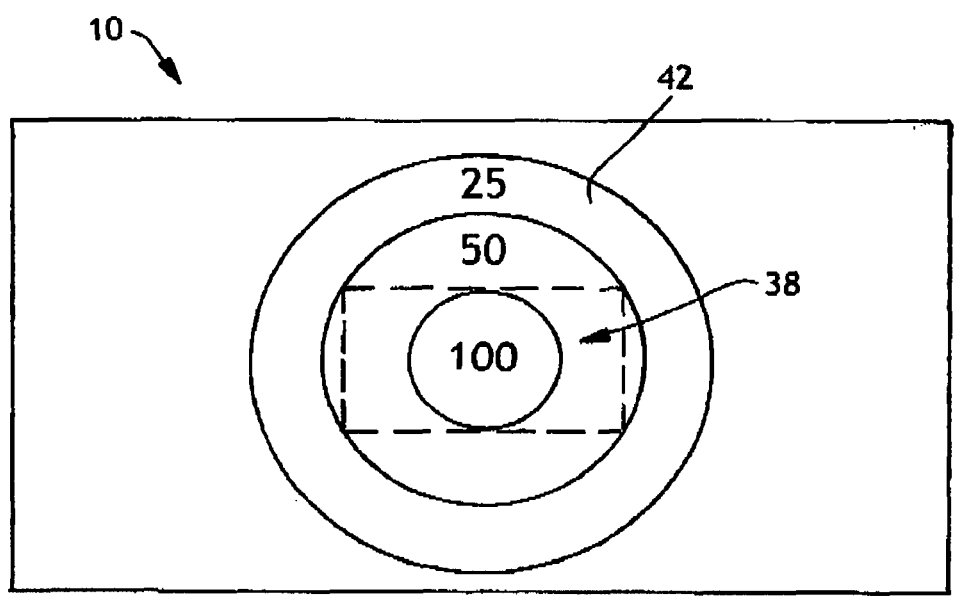
FIG. 10 illustrates an exemplary facial tissue sheet having a target zone and a first-side graphic where a portion of the first-side graphic is located in the target zone.

In some aspects, it may be desirable to place the first-side tissue graphic in a certain location on the first side of the facial tissue sheet. In general, the first-side tissue graphic can desirably comprise a portion of the entire first side of the facial tissue sheet. In some particular aspects, it is desirable that the graphic direct the child to blow his or her nose into a target zone of the facial tissue sheet. FIG. 9 exhibits a target zone 38 of a first side 12 of a facial tissue sheet 10 of the present invention. For instance, in the example comprising a monster theme described above, where the monster appears as a permanent graphic with its mouth open (e.g., FIG. 3), the mouth could be located in the target zone of the facial tissue sheet, such that nasal discharge will be deposited substantially in a center area of the sheet when feeding the monster. In another example, referring to the bullseye theme described above, the bullseye of the target could be placed in the target zone of the facial tissue sheet, such that the child will score more points by "hitting" the target zone than when depositing nasal discharge elsewhere, such as seen in FIG. 10. Thus, placing the first-side graphic 42 in the target zone 38 of the tissue sheet 10 may not only improve the child's ability to properly use a facial tissue from a hygiene standpoint, but can also generally improve his or her hand-eye coordination.

Figure 11:
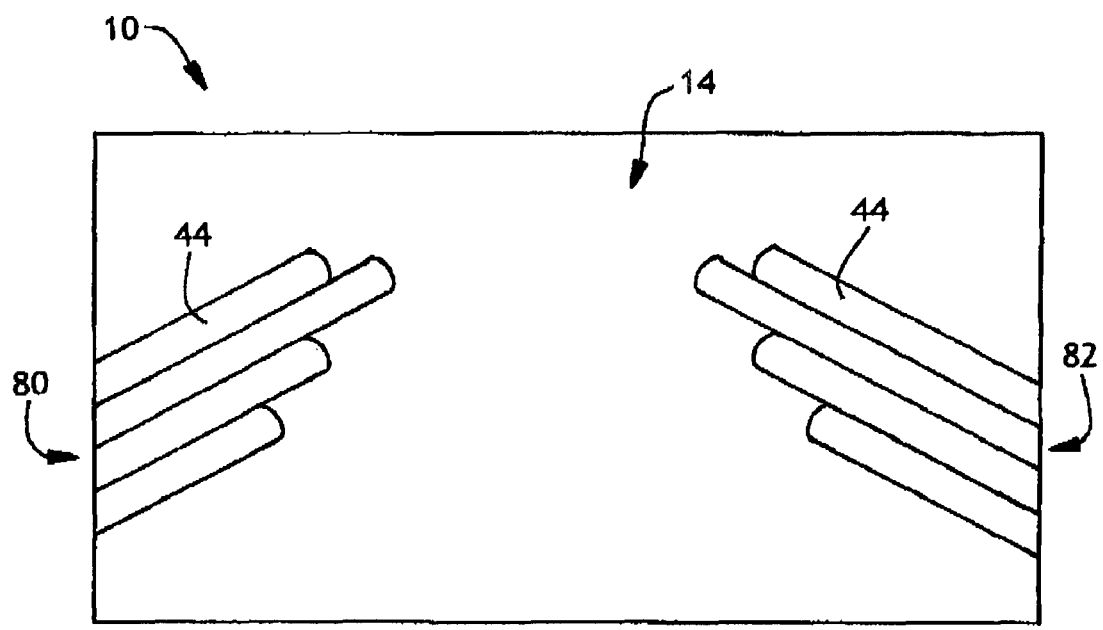
FIG. 11 is a perspective view of a facial tissue sheet of the present invention having a second-side tissue graphic that is visible on the second side of the facial tissue sheet.

In some aspects, the training device and method of the present invention may also include a second-side graphic. Referring to FIG. 11, a second-side graphic 44 is disposed on the second side 14 of the facial tissue sheet 10. In some aspects, the second-side graphic 44 may comprise at least one permanent graphic and/or at least one active graphic. In some aspects, the second-side graphic 44 can be a training mark. For example, the second-side graphic 44 may be depicted as several permanent graphics which correspond to the child's fingers. The graphics could be placed toward the edges of the facial tissue sheet, for example toward two opposing edges 80, 82 such as seen in FIG. 11. Thus, the second-side graphic 44 in this example could function as a training mark in that it motivates the child to interact with the second side 14 of facial tissue sheet 10 by placing his or her fingers onto the graphics 44, thus interactively training the child how to properly grasp or hold the tissue 10 for proper nasal discharge. In another example (not shown), the second-side graphic of the previous example could comprise active graphics such that when the facial tissue sheet is held correctly, heat from the child's fingers could cause the graphics to appear, disappear or change. The child is therefore motivated to properly interact with (i.e., properly hold) the facial tissue in order to obtain the reward of activating the second-side graphic.

Figure 12A:
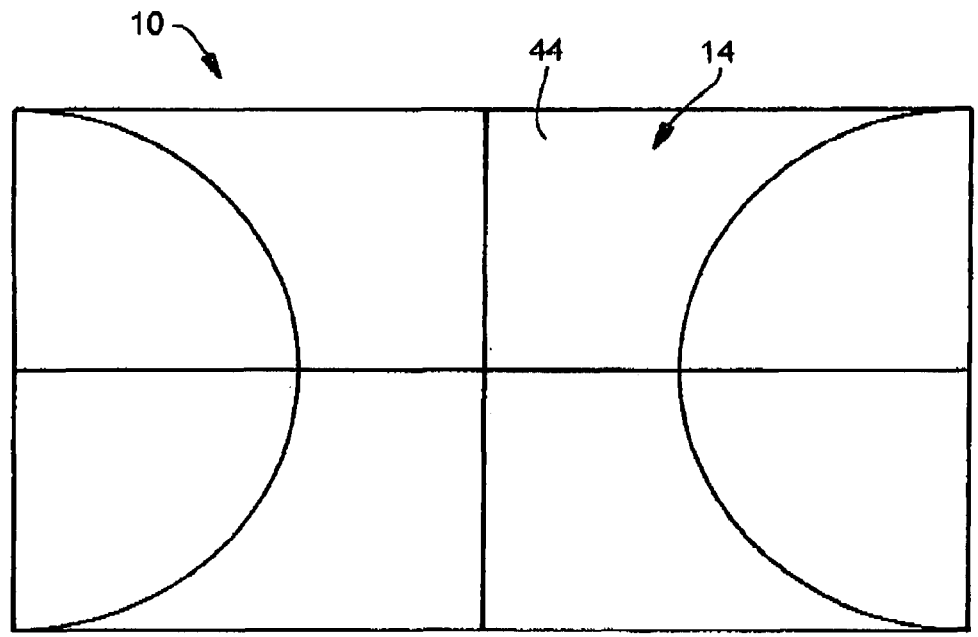
FIG. 12A illustrates an exemplary facial tissue sheet having a second-side tissue graphic in the form of a basketball surface.
Figure 12B:
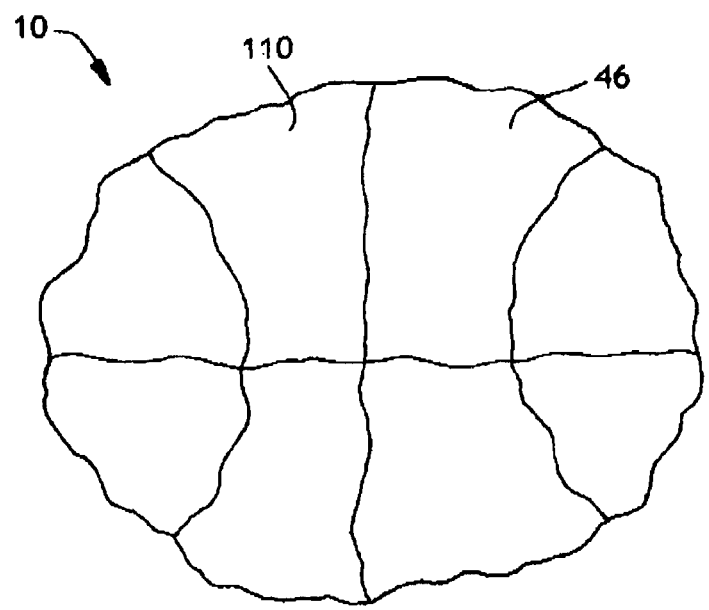
FIG. 12B illustrates an exemplary wadded-up facial tissue sheet in the form of a basketball.

In yet another example, the second side 14 of the facial tissue sheet 10 may comprise a second-side graphic 44 that resembles the surface of a basketball and covers substantially the entire area of the second side 14, such as seen in FIG. 12A. After nasal discharge has been completed, the child can then be motivated to wad-up the facial tissue sheet 10 into a ball 110 to form a "basketball" 46, such as seen in FIG. 12B, thus training and motivating the child to properly enclose of the facial tissue sheet 10 after use. The child is therefore motivated to properly interact with the facial tissue in order to obtain the reward of forming a basketball. In some aspects, the second-side graphic 44 may be thematically related to the first-side graphic 42.

Figure 13A:
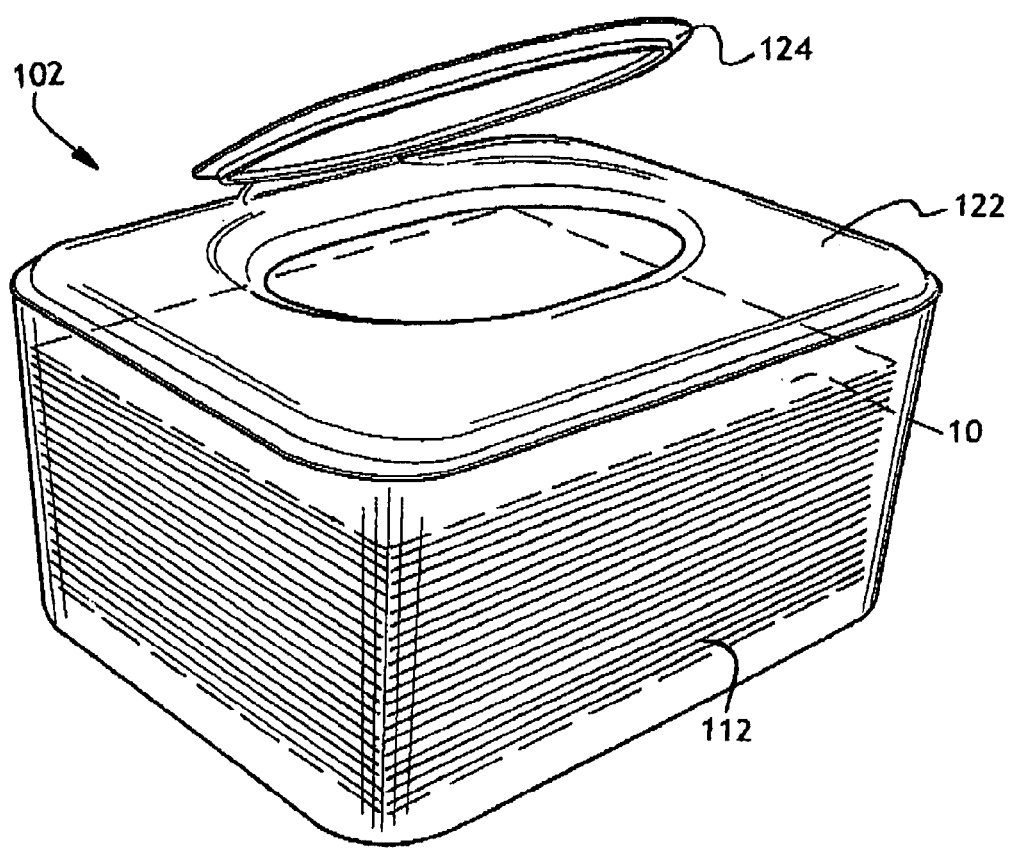
FIG. 13A is a perspective view of an exemplary reusable container.

In some aspects of the present invention, the training device and method may also include a container. The container may be used for storing and/or dispensing the facial tissue sheet. The container may be disposable or reusable. As used herein, the term "reusable" refers to a container adapted to accept product provided separately from the container. For example, in one aspect, a side of the container can be opened to place product into the container and then closed to contain the product. In another aspect, a lid can be opened to place product into the container and then closed to contain the product. For example referring to FIG. 13A a suitable reusable container 102 is illustrated. As shown, the container 102 includes a side wall 112 attached to a top 122 that defines a dispensing lid 124. The side wall 112 can be attached to the top 122 at only one side such that the top 122 can be opened (not shown) to place a plurality of facial tissue sheets 10 into the container 102 and then closed to contain the product within.

Figure 13B:
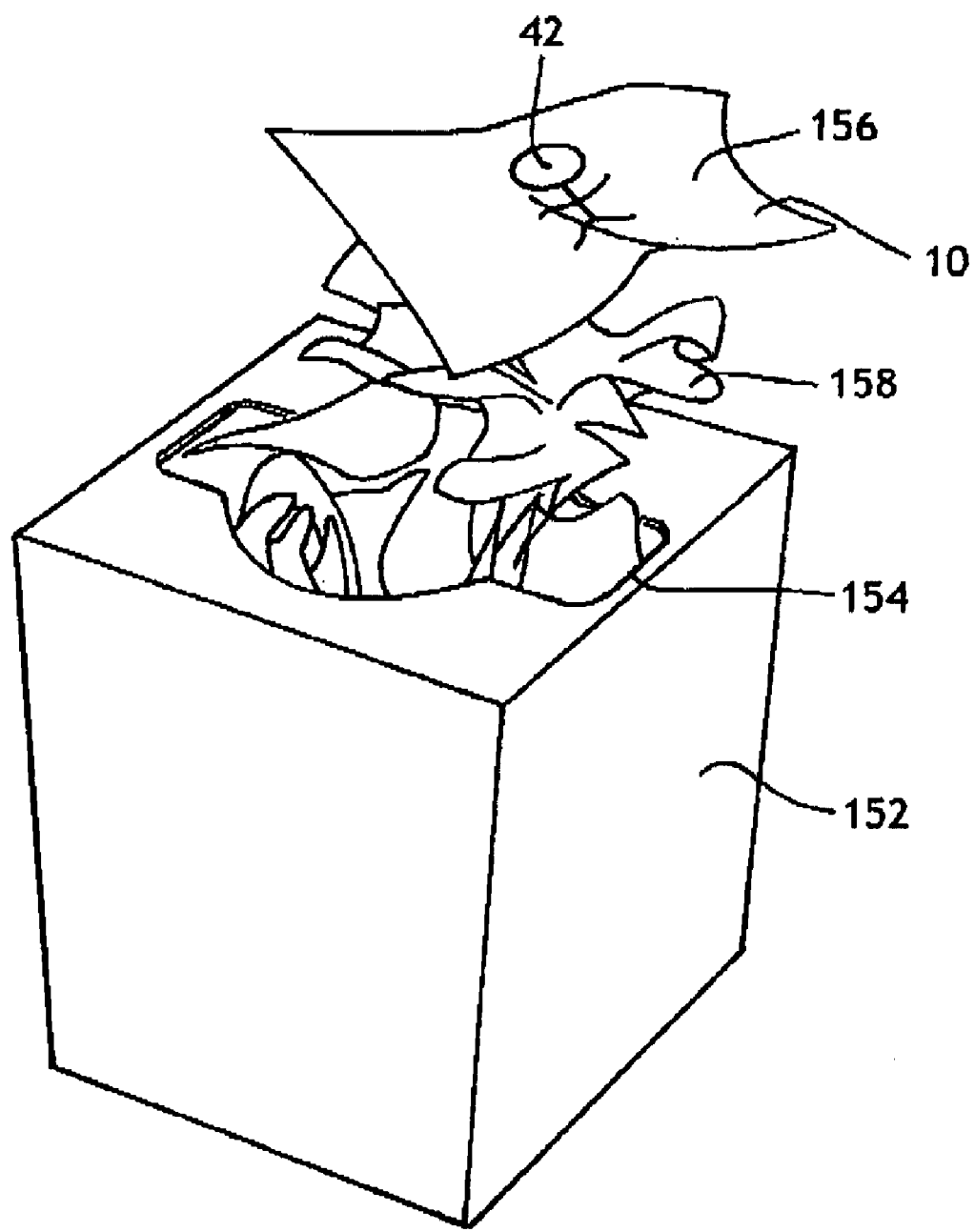
FIG. 13B is a perspective view of an exemplary disposable container.

Other containers suitable for the present invention are well known in the art. For example, referring to FIG. 13B, a disposable container 152 defining an opening 154 for dispensing the facial tissue sheet 10 of the present invention is provided. Contained within the container 152 is a stack of the facial tissue sheets. In some aspects, the tissue sheets, for example, may be contained within the container 152 in an interfolded relationship and may be positioned so as to be dispensed from the container 152 one at a time through the opening 154. In one aspect, for instance, the facial tissue sheets 10 which comprise a first-side tissue graphic 42 may be interfolded such that when the leading sheet 156 is dispensed from the container 152, a preceding sheet 158 is partially withdrawn through the opening 154. In other aspects, the tissue sheets can be stacked one on top of the other, but not interfolded. In still other aspects, the sheets can be attached together along a line of perforations.

Figure 14:
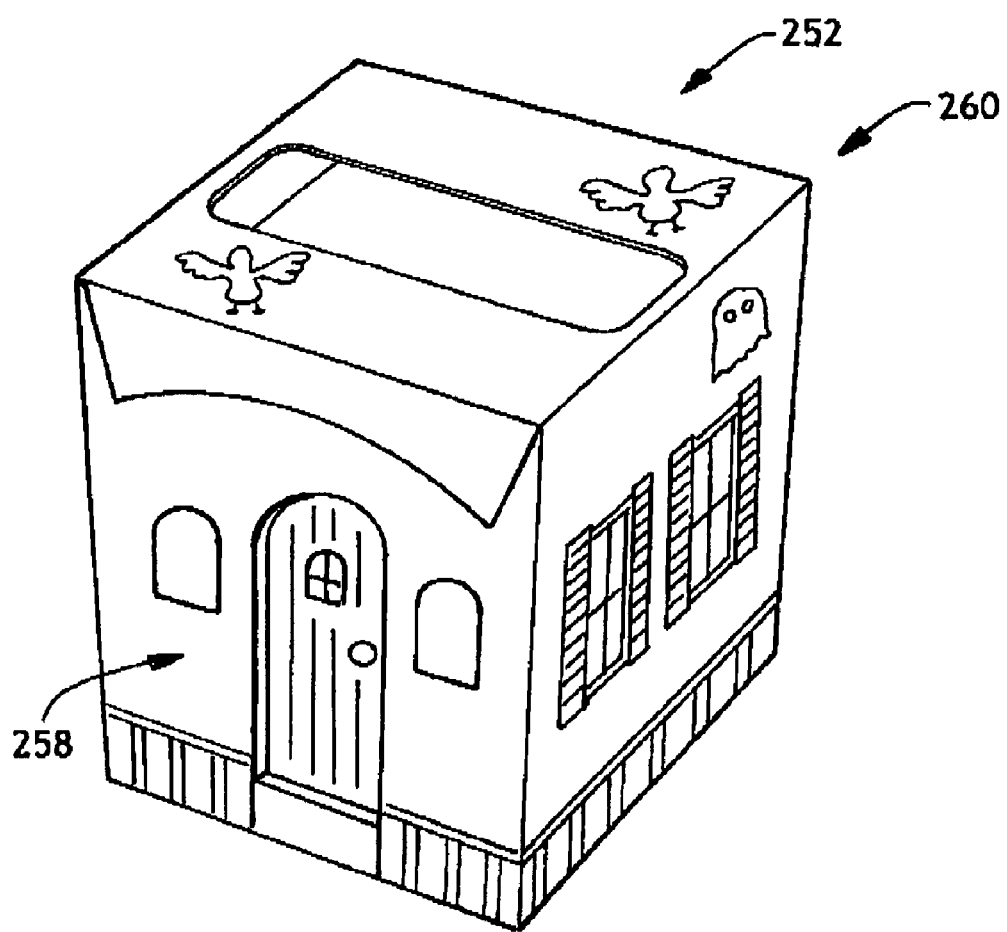
FIG. 14 is a perspective view of an exemplary container having a theme.
Figure 15:
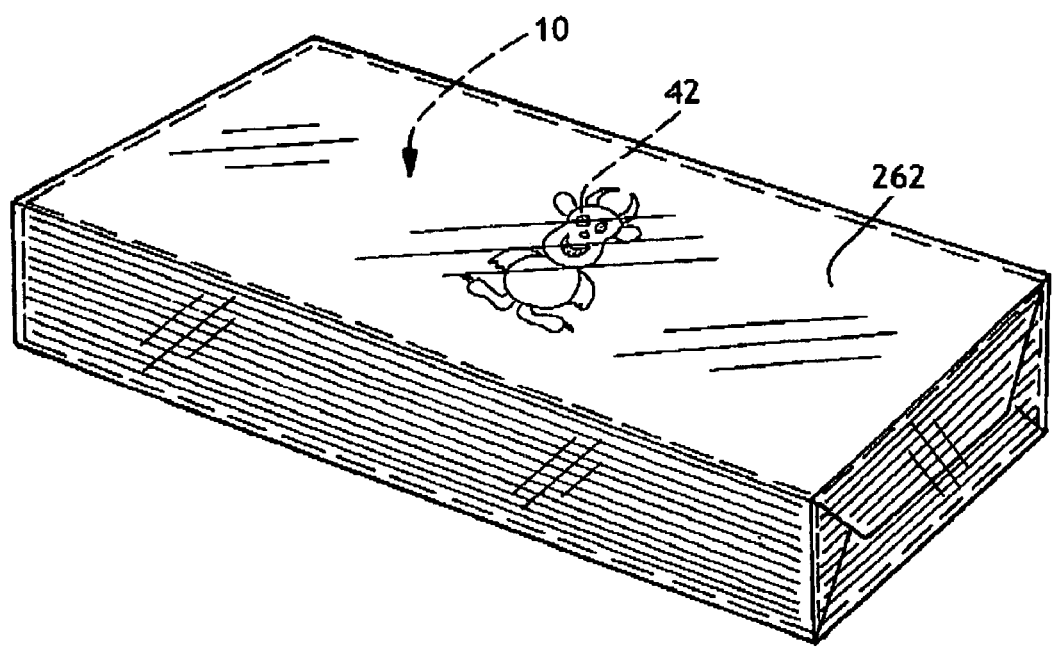
FIG. 15 is a perspective view of an exemplary container that is transparent.

In some aspects, the container can comprise a graphic design located on the outer surface of the container. In some particular aspects, the graphic design is thematically related to the first-side tissue graphic 42 of the facial tissue sheet 10 of the present invention. For example, continuing with the monster theme discussed above, the container 252 could comprise a graphic design 258 which transforms the container 252 into the monster's house 260, such as depicted in FIG. 14. Thus, the child can immediately recognize that facial tissue sheets 10 comprising the monster graphic are available inside. In another particular aspect, a plurality of the facial tissue sheets 10 may be contained in a container 262 that is transparent, and which optionally may be disposable, such as depicted in FIG. 15. One such container could be a flexible poly-wrap, such as may be used on facial tissue pocket packs. In this embodiment, the first-side tissue graphic 42 could serve as an indicator to the user that the facial tissue sheets 10 of the present invention are available within.

In some aspects, a plurality of facial tissue sheets, such as those located in a container for example, can comprise a series of tissue graphics (not shown). In other words, each facial tissue sheet in the series can have a different graphic. For example, in a series of three, the first facial tissue sheet in the series can comprise the friendly monster training mark described above, the second facial tissue sheet in the series can comprise the camp fire training mark described above, and the third facial tissue sheet in the series can comprise the bullseye training mark described above. In some aspects, it may be desirable that each graphic in the series is different, but thematically related.

Figure 16:
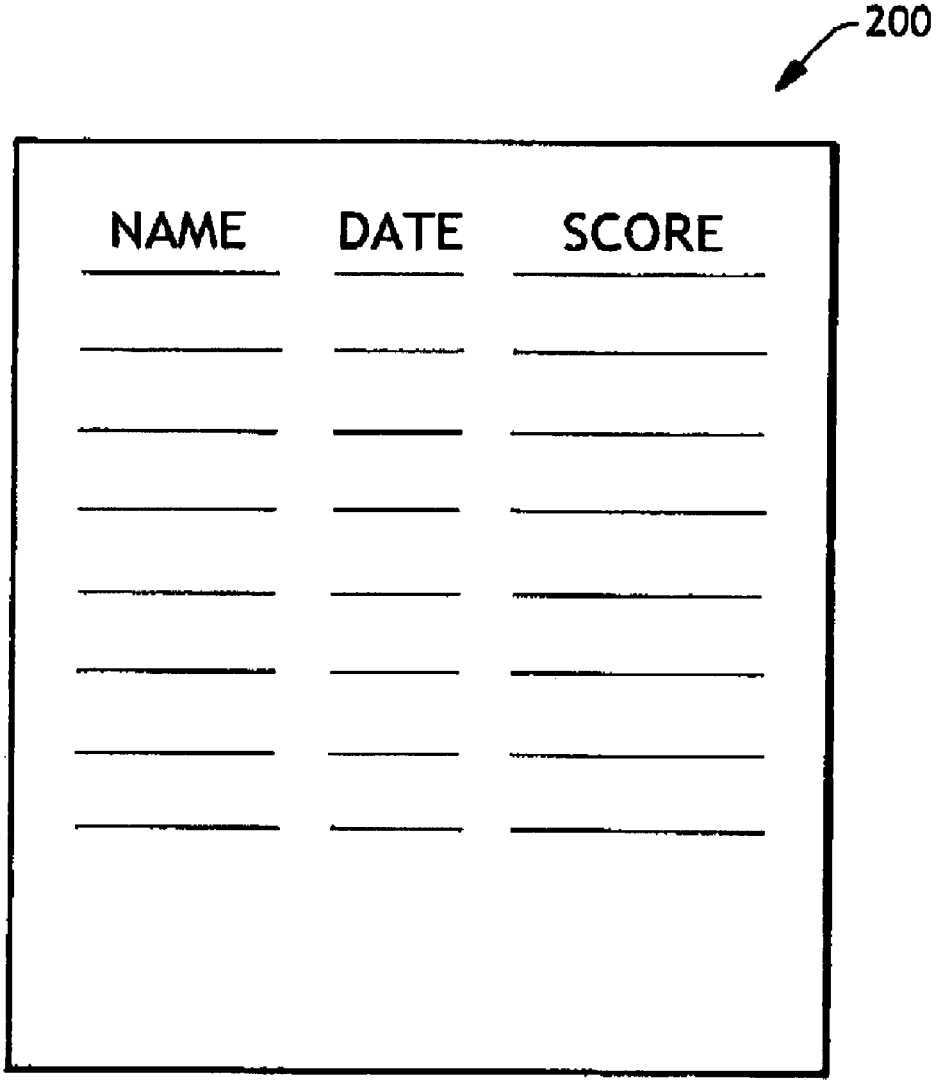
FIG. 16 illustrates a score card.

The training device and method of the present invention can also comprise various additional items to make training even more fun and/or interactive, and to provide additional motivation. For instance, in some aspects, a score card 200 could be provided with the device, such as seen in FIG. 16. In some aspects, the score card 200 could be thematically related to the first-side tissue graphic. For example, in the case of the bullseye target theme describe above, the score card 200 could be configured to record a score after nasal discharge by adding the numbers which appear in a bullseye target graphic.

Figure 17:
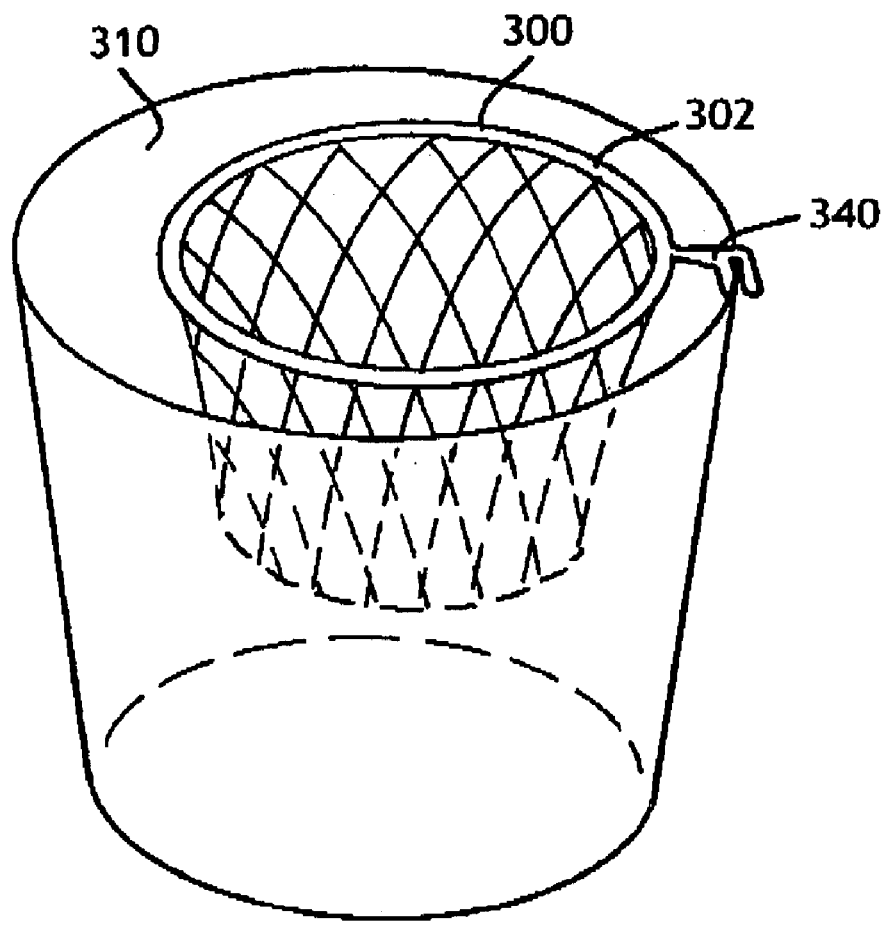
FIG. 17 illustrates an exemplary wastebasket interactive object.

In other aspects, a wastebasket interactive object 300 could be included, such as seen in FIG. 17. For instance, in the example described above wherein the facial tissue sheet comprises a second-side graphic design which resembles the surface of a basketball (e.g., FIGS. 12A-12B), the wastebasket interactive object 300 could resemble a basketball hoop 320 that can be placed onto the top of a wastebasket 310. The basketball hoop 320 of this example could be attached to the wastebasket 310 by a clip 340, tape (not shown), adhesive (not shown) or any other attachment means known in the art. In this example, after wadding the facial tissue sheet 10 into a basketball 46 (e.g., FIGS. 12A-12B), the child would be motivated to drop the used, wadded facial tissue sheet 10 into the basketball hoop 320, thus providing training and motivation to properly dispose of the facial tissue sheet 10 into the wastebasket 310.

In some aspects, a set of caregiver instructions can be provided with the training device of the present invention. The instructions can assist the caregiver with how to properly enable or utilize the training device. The instructions an also comprise additional information which can be beneficial to caregiver and/or the user of the training device.

It will be appreciated that details of the foregoing examples, given for purposes of illustration, are not to be construed as limiting the scope of this invention. Although only a few exemplary embodiments of this invention have been described in detail above, those skilled in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of this invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A training device for nasal hygiene comprising a facial tissue sheet;
    wherein the facial tissue sheet has a first side, and second side having an opposing planar relationship to the first side;
    wherein a first-side tissue graphic is visible on the first side of the facial tissue sheet;
    wherein the first-side tissue graphic comprises an active graphic; and
    wherein the first-side tissue graphic is a training mark.

2. The training device of claim 1 comprising a permanent graphic and an active graphic wherein the permanent graphic and the active graphic are thematically related.

3. The training device of claim 1 wherein the first-side tissue graphic directs a user to a target zone on the facial tissue sheet.

4. The training device of claim 1 wherein the first-side tissue graphic is disposed on an inner substrate layer of the facial tissue sheet.

5. The training device of claim 1 further comprising a second-side tissue graphic that is visible on the second side of the facial tissue sheet.

6. The training device of claim 5 wherein the second-side tissue graphic comprises a permanent graphic and/or an active graphic.

7. The training device of claim 5 wherein the second-side tissue graphic is a training mark.

8. The training device of claim 1 further comprising a container.

9. The training device of claim 8 wherein the container comprises a graphic design thematically related to the first-side tissue graphic.

10. The training device of claim 8 wherein the container is reusable.

11. The training device of claim 8 wherein a plurality of the facial tissue sheets are stacked together within the container.

12. The training device of claim 11 wherein the plurality of facial tissue sheets are arranged so as to be dispensed one at a time from the container.

13. The training device of claim 11 wherein the plurality of facial tissue sheets comprises a series of training marks that are each different.

14. The training device of claim 13 wherein the training marks are thematically related.

15. The training device of claim 1 further comprising a score card.

16. The training device of claim 1 further comprising a wastebasket interactive object.

17. The training device of claim 16 wherein the wastebasket interactive object is thematically related to the first-side tissue graphic.

18. The training device of claim 5 further comprising a wastebasket interactive object that is thematically related to the second-side tissue graphic.

19. A method of providing a system for nasal discharge training comprising:
- (A) providing a facial tissue sheet having a first side, and a second side in opposing planar relationship to the first side;
- (B) disposing a first-side tissue graphic onto the first side of the facial tissue sheet; and
- (C) enabling the user to properly utilize the facial tissue sheet for nasal discharge;

wherein the first-side tissue graphic comprises an active graphic; and wherein the first-side tissue graphic is a training mark.

20. The method of claim 19 further comprising the step of disposing a second-side tissue graphic onto the second side of the facial tissue sheet, wherein the second-side graphic is visible on the second side, and wherein the second-side tissue graphic is a training mark.

21. The method of claim 19 further comprising the step of providing a container for the facial tissue sheet.

22. The method of claim 19 further comprising the step of providing a score card.

23. The method of claim 19 further comprising the step of providing a wastebasket interactive object.

24. The method of claim 19 further comprising the step of providing a set of caregiver instructions.

* * * * *